(12) United States Patent
Lee et al.

(10) Patent No.: US 8,576,789 B2
(45) Date of Patent: Nov. 5, 2013

(54) METHOD AND APPARATUS FOR ALLOCATING RANGING CHANNEL FOR SYNCHRONIZED MOBILE STATION IN WIRELESS COMMUNICATION SYSTEM

(75) Inventors: Hyun Woo Lee, Seoul (KR); Han Gyu Cho, Seoul (KR); Jin Sam Kwak, Seoul (KR); Yeong Hyeon Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 12/870,586

(22) Filed: Aug. 27, 2010

(65) Prior Publication Data

US 2011/0051688 A1 Mar. 3, 2011

Related U.S. Application Data

(60) Provisional application No. 61/237,702, filed on Aug. 28, 2009, provisional application No. 61/260,024, filed on Nov. 11, 2009.

(30) Foreign Application Priority Data

Jul. 20, 2010 (KR) ........................ 10-2010-0069753

(51) Int. Cl.
*H04W 4/00* (2009.01)
(52) U.S. Cl.
USPC ........... 370/329; 370/331; 370/431; 455/436; 455/450; 455/509; 709/726
(58) Field of Classification Search
None
See application file for complete search history.

(56) References Cited

U.S. PATENT DOCUMENTS

| | | | |
|---|---|---|---|
| 5,867,500 A * | 2/1999 | Dolman et al. | 370/395.4 |
| 2009/0247084 A1 * | 10/2009 | Palanki | 455/63.1 |
| 2010/0150100 A1 * | 6/2010 | Chen et al. | 370/330 |
| 2010/0195566 A1 * | 8/2010 | Krishnamurthy et al. | 370/328 |

FOREIGN PATENT DOCUMENTS

| | | |
|---|---|---|
| CN | 101247172 | 8/2008 |
| WO | 2006/101368 | 9/2006 |

OTHER PUBLICATIONS

The State Intellectual Property Office of the People's Republic of China Application Serial No. 201010266522.8, Office Action dated Feb. 28, 2013, 7 pages.

* cited by examiner

*Primary Examiner* — Yemane Mesfin
*Assistant Examiner* — Khoa Huynh
(74) *Attorney, Agent, or Firm* — Lee, Hong, Degerman, Kang & Waimey

(57) ABSTRACT

A method and apparatus for allocating a ranging channel for a synchronized mobile station in a wireless communication system is provided. A base station (BS) allocates the ranging channel for the synchronized mobile station in a first subframe and a first subband. An index of the first subframe and an index of the first subband are determined respectively based on an index of a second subframe and an index of a second subband in which a ranging channel of a non-synchronized mobile station is allocated.

18 Claims, 14 Drawing Sheets

METHOD AND APPARATUS FOR ALLOCATING RANGING CHANNEL FOR SYNCHRONIZED MOBILE STATION IN WIRELESS COMMUNICATION SYSTEM

This application claims the benefit of U.S. Provisional Application Ser. Nos. 61/237,702 filed on Aug. 28, 2009, and 61/260,024 filed on Nov. 11, 2009, and also claims the benefit of earlier filing date and right of priority to Korean Patent application No. 10-2010-0069753 filed on Jul. 20, 2010, the contents of all of which are incorporated by reference in their entirety herein.

BACKGROUND OF THE INVENTION

1. Field of the Invention

The present invention relates to wireless communications, and more particularly, to a method and apparatus for allocating a ranging channel for a synchronized mobile station in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control channel can be defined for transmission of an uplink control signal. Examples of the uplink control channel are various such as a fast feedback channel, a hybrid automatic repeat request (HARQ) feedback channel, a sounding channel, a ranging channel, a bandwidth request channel, etc. The fast feedback channel carries feedback of a channel quality indicator (CQI) and/or multiple-input multiple-output (MIMO) information, and can be classified into a primary fast feedback channel and a secondary fast feedback channel. The HARQ feedback channel is a channel for transmitting an acknowledgement (ACK)/non-acknowledgement (NACK) signal as a response for data transmission. The sounding channel can be used as an uplink channel response for closed-loop MIMO transmission and uplink scheduling. The bandwidth request channel is a channel for requesting a radio resource for transmitting a control signal or uplink data to be transmitted by a mobile station (MS).

The ranging channel can be used for uplink synchronization. The ranging channel can be classified into a ranging channel for a non-synchronized MS and a ranging channel for a synchronized MS. The ranging channel for the non-synchronized MS can be used for ranging on a target base station (BS) during initial network entry and handover. In a subframe in which the ranging channel for the non-synchronized MS is to be transmitted, the MS may not transmit any uplink burst or uplink control channel. The ranging channel for the synchronized MS can be used for periodic ranging. An MS which has already been synchronized with the target BS can transmit a ranging signal for the synchronized MS.

Meanwhile, various frame structures and allocated resources need to be taken into account when a base station (BS) allocates a ranging channel. When a ranging channel for a non-synchronized mobile station (MS) and a ranging channel for a synchronized MS are allocated together, the BS needs to allocate the channels by avoiding overlapping of the two channels.

Accordingly, there is a need for a method of allocating the ranging channel for the non-synchronized MS and the ranging channel for the synchronized MS by avoiding overlapping of resources to be allocated.

SUMMARY OF THE INVENTION

The present invention provides a method and apparatus for allocating a ranging channel for a synchronized mobile station in a wireless communication system.

In an aspect, a method of allocating a ranging channel for a synchronized mobile station in a wireless communication system is provided. The method include allocating the ranging channel for the synchronized mobile station in a first subframe and a first subband, wherein an index of the first subframe and an index of the first subband are determined respectively based on an index of a second subframe and an index of a second subband in which a ranging channel of a non-synchronized mobile station is allocated. The first subframe and the first subband may not overlap with the second subframe and the second subband, respectively. The index of the first ranging subband may be different from the index of the second subband by a subband offset. The index of the first subband may be determined based on a cell identifier (ID) and the number of allocated subbands. The index of the first subband may be determined based on the equation $I_{SB}=\mathrm{mod}(\mathrm{IDcell}+1, Y_{SB})$, where $I_{SB}$ denotes a subband index, IDCell denote the cell ID, $Y_{SB}$ denotes the number of allocated subbands, and mod(a,b) denotes a remainder obtained by dividing a by b. The index of the first subframe may be different from the index of the second subframe by a subframe offset. The index of the first subframe may be determined based on a subframe offset $O_{SF}$ of the ranging channel for the non-synchronized mobile station and the number $N_{UL}$ of uplink subframes per frame. The index of the first subframe may be mod($O_{SF}$+1,$N_{UL}$). An index of a first frame comprising the first subframe and an index of a second frame comprising the second subframe may be different by a frame offset. The second frame may be a first frame of a superframe in which the ranging channel for the non-synchronized mobile station is allocated, and the first frame may be a second frame of a superframe in which the ranging channel for the synchronized mobile station is allocated. The ranging channel for the synchronized mobile station may be allocated in every superframe or in a superframe of which superframe index is a multiple of 4 or 8. The ranging channel for the synchronized mobile station may be a periodic ranging channel for periodic ranging. The ranging channel for the non-synchronized mobile station may be one of a ranging channel for initial network entry and association or a handover ranging channel for ranging on a target base station during a handover. The first subband or the second subband may include 72 consecutive subcarriers.

In another aspect, an apparatus for allocating a ranging channel for a non-synchronized mobile station in a wireless communication system is provided. The apparatus include a radio frequency (RF) unit for transmitting or receiving a radio signal, and a processor, coupled to the RF unit, and configured to allocate the ranging channel for a synchronized mobile station in a first subframe and a first subband, wherein an index of the first subframe and an index of the first subband are determined respectively based on an index of a second subframe and an index of a second subband in which the ranging channel of the non-synchronized mobile station is allocated. The index of the first subband may be determined based on the equation $I_{SB}$=mod(IDcell+1,$Y_{SB}$), where $I_{SB}$ denotes a subband index, IDCell denote a cell ID, $Y_{SB}$ denotes the number of allocated subbands, and mod(a,b) denotes a remainder obtained by dividing a by b. The index of the first subframe may be mod($O_{SF}$+1,$N_{UL}$), where $O_{SF}$ denotes a subframe offset of the ranging channel for the non-synchronized mobile station and $N_{UL}$ denotes the number of uplink subframes per frame. A second frame comprising the second subframe may be a first frame of a superframe in which the ranging channel for the non-synchronized mobile station is allocated, and a first frame comprising the first subframe may be a second frame of a superframe in which the ranging channel for the synchronized mobile station is allocated. The ranging channel for the synchronized mobile station may be a periodic ranging channel for periodic ranging. The ranging channel for the non-synchronized mobile station may be one of a ranging channel for initial network entry and association or a handover ranging channel for ranging on a target base station during a handover.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LET) is part of evolved UMTS (E-UMTS) using evolved-UMTS terrestrial radio access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
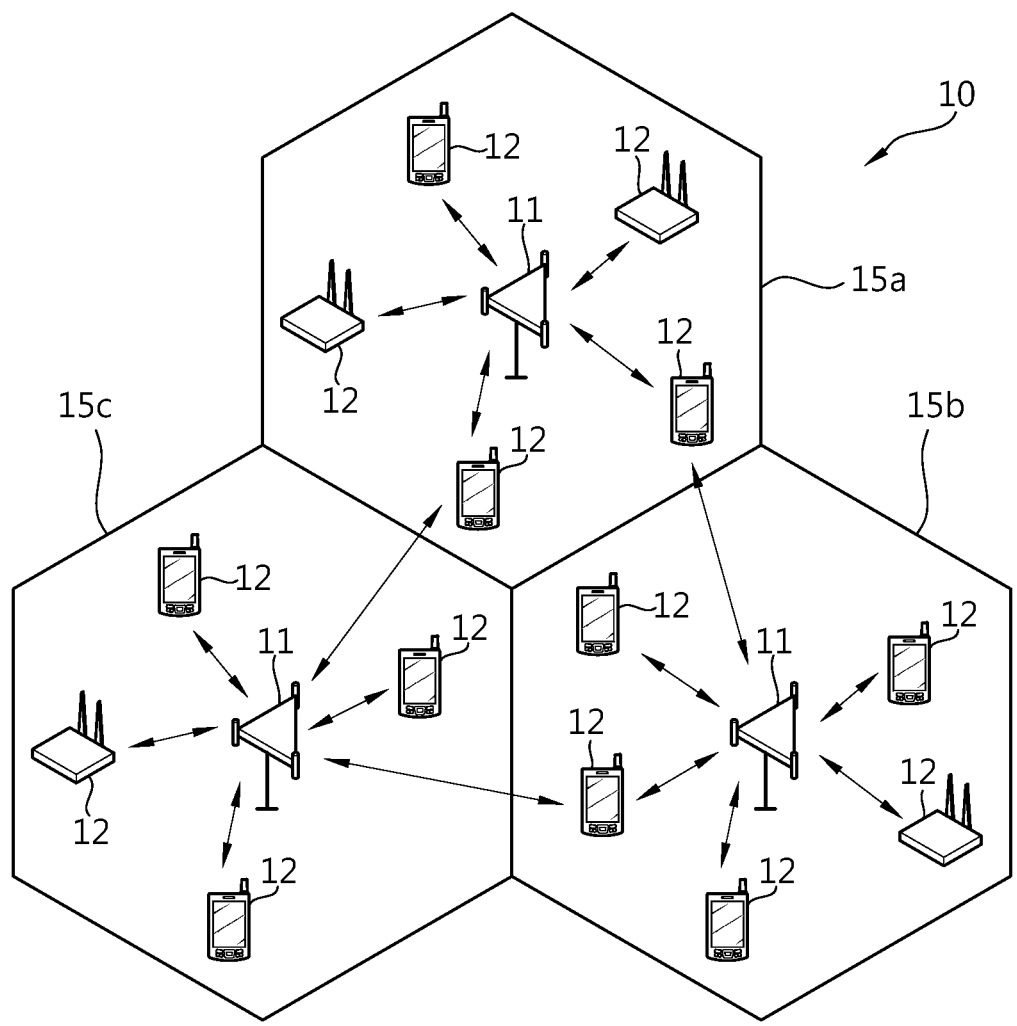
FIG. 1 shows a wireless communication system.

FIG. 1 shows a wireless communication system.
Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
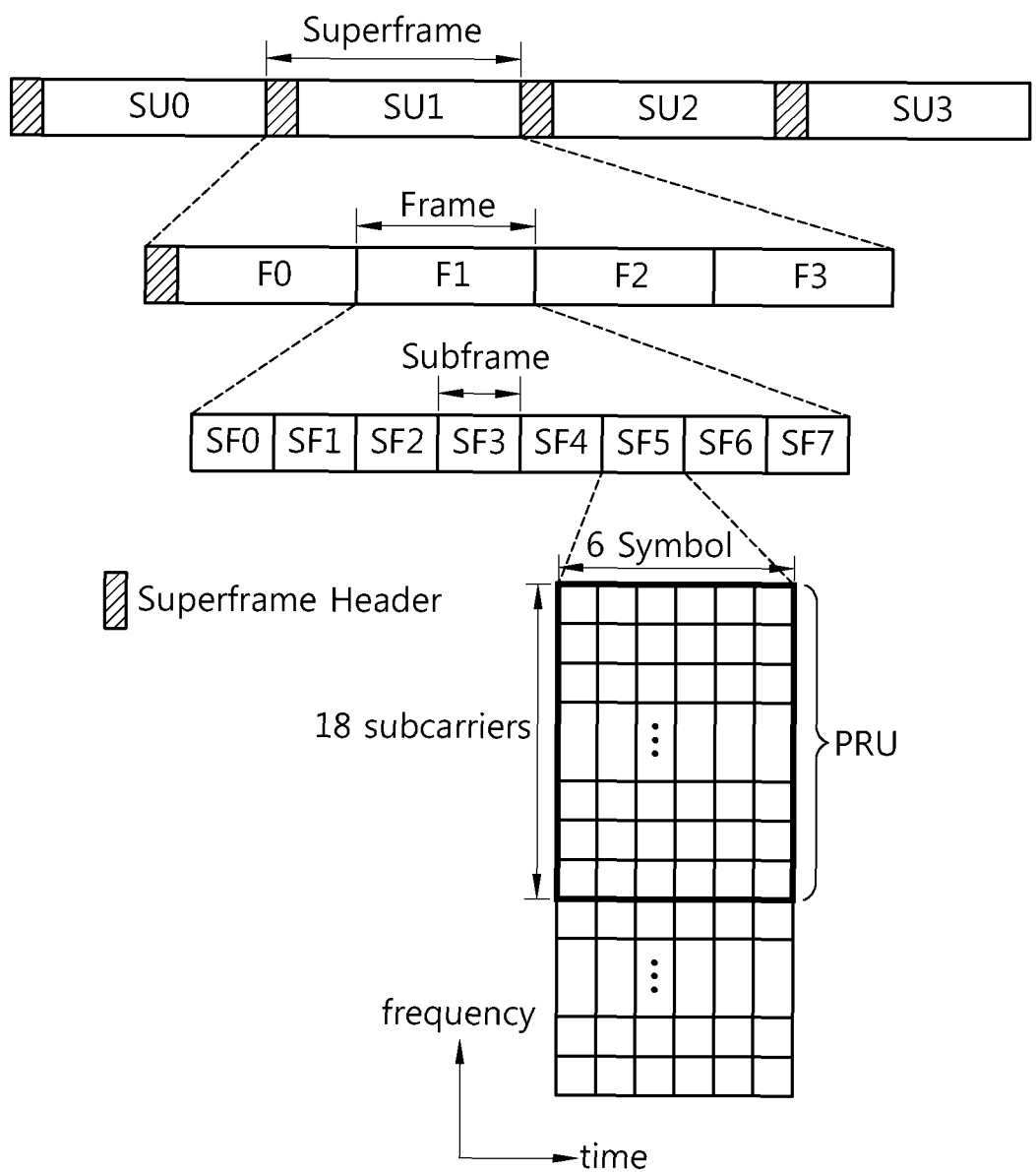
FIG. 2 to FIG. 6 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

A superframe header (SFH) can carry an essential system parameter and system configuration information. The SFH may be located in a first subframe of a superframe. The SFH may occupy last 5 Orthogonal Frequency-Division Multiple Access (OFDMA) symbols of the first subframe. The SFH can be classified into a primary-SFH (P-SFH) and a secondary-SFH (S-SFH). The P-SFH and the S-SFH can be transmitted in every superframe. The S-SFH can be transmitted in two consecutive superframes. Information transmitted on the S-SFH can be classified into three sub-packets, i.e., an S-SFH SP1, an S-SFH SP2, and an S-SFH SP3. Each sub-packet can be transmitted periodically with a different period. Information transmitted in the S-SFH SP1, the S-SFH SP2, and the S-SFH SP3 may have different importance from one another. The S-SFH SP1 may be transmitted with a shortest period, and the S-SFH SP3 may be transmitted with a longest period. The S-SFH SP1 includes information on network re-entry. The S-SFH SP1 may include information on a ranging channel, resource mapping information such as subband partitioning and frequency partitioning, legacy support information for the support of an IEEE 802.16e mobile station (MS), etc. The S-SFH SP2 includes information on initial network entry and network discovery. The S-SFH SP3 includes other important system information.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDMA symbol is for representing one symbol period, and can be referred to as other terminologies such as an OFDMA symbol, an SC-FDMA symbol, etc., according to a multiple access scheme. The subframe can consist of 5, 6, 7, or 9 OFDMA symbols. However, this is for exemplary purposes only, and thus the number of OFDMA symbols included in the subframe is not limited thereto. The number of OFDMA symbols included in the subframe may change variously according to a channel bandwidth and a CP length. A subframe type may be defined according to the number of OFDMA symbols included in the subframe. For example, it can be defined such that a type-1 subframe includes 6 OFDMA symbols, a type-2 subframe includes 7 OFDMA symbols, a type-3 subframe includes 5 OFDMA symbols, and a type-4 subframe includes 9 OFDMA symbols. One frame may include subframes each having the same type. Alternatively, one frame may include subframes each having a different type. That is, the number of OFDMA symbols included in each subframe may be identical or different in one frame. Alternatively, the number of OFDMA symbols included in at least one subframe of one frame may be different from the number of OFDMA symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDMA symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDMA symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| Channel bandwidth, BW(MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, Fs(MHz) | | | 5.6 | 8 | 10 | 11.2 | 22.4 |
| FFT size, $N_{FFT}$ | | | 512 | 1024 | 1024 | 1024 | 2048 |
| Subcarrier spacing, $\Delta f$(kHz) | | | 10.94 | 7.81 | 9.77 | 10.94 | 10.94 |
| Useful symbol time, Tb(μs) | | | 91.4 | 128 | 102.4 | 91.4 | 91.4 |
| G = ⅛ | Symbol time, Ts(μs) | | 102.857 | 144 | 115.2 | 102.857 | 102.857 |
| | FDD | Number of OFDMA symbols per 5 ms frame | 48 | 34 | 43 | 48 | 48 |
| | | Idle time(μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG(μs) | 165.714 | 248 | 161.6 | 165.714 | 165.714 |

TABLE 1-continued

| | | | | | | | |
|---|---|---|---|---|---|---|---|
| G = 1/16 | | Symbol time, Ts(μs) | 97.143 | 136 | 108.8 | 97.143 | 97.143 |
| | FDD | Number of OFDMA symbols per 5 ms frame | 51 | 36 | 45 | 51 | 51 |
| | | Idle time(μs) | 45.71 | 104 | 104 | 45.71 | 45.71 |
| | TDD | Number of OFDMA symbols per 5 ms frame | 50 | 35 | 44 | 50 | 50 |
| | | TTG + RTG(μs) | 142.853 | 240 | 212.8 | 142.853 | 142.853 |
| G = 1/4 | | Symbol time, Ts(μs) | 114.286 | 160 | 128 | 114.286 | 114.286 |
| | FDD | Number of OFDMA symbols per 5 ms frame | 43 | 31 | 39 | 43 | 43 |
| | | Idle time(μs) | 85.694 | 40 | 8 | 85.694 | 85.694 |
| | TDD | Number of OFDMA symbols per 5 ms frame | 42 | 30 | 38 | 42 | 42 |
| | | TTG + RTG(μs) | 199.98 | 200 | 136 | 199.98 | 199.98 |
| Number of Guard subcarriers | | Left | 40 | 80 | 80 | 80 | 160 |
| | | Right | 39 | 79 | 79 | 79 | 159 |
| Number of used subcarriers | | | 433 | 865 | 865 | 865 | 1729 |
| Number of PRU in type-1 subframe | | | 24 | 48 | 48 | 48 | 96 |

In Table 1, $N_{FFT}$ denotes a smallest power of 2 greater than $N_{used}$. A sampling factor is defined as $F_s$=floor(n·BW/8000)× 8000. A subcarrier spacing is defined as $\Delta f=Fs/N_{FFT}$. A useful symbol time is defined as Tb=1/Δf. A CP time is defined as Tg=G·Tb. An OFDMA symbol time is defined as Ts=Tb+Tg. A sampling time is defined as $Tb/N_{FFT}$.

Figure 3:
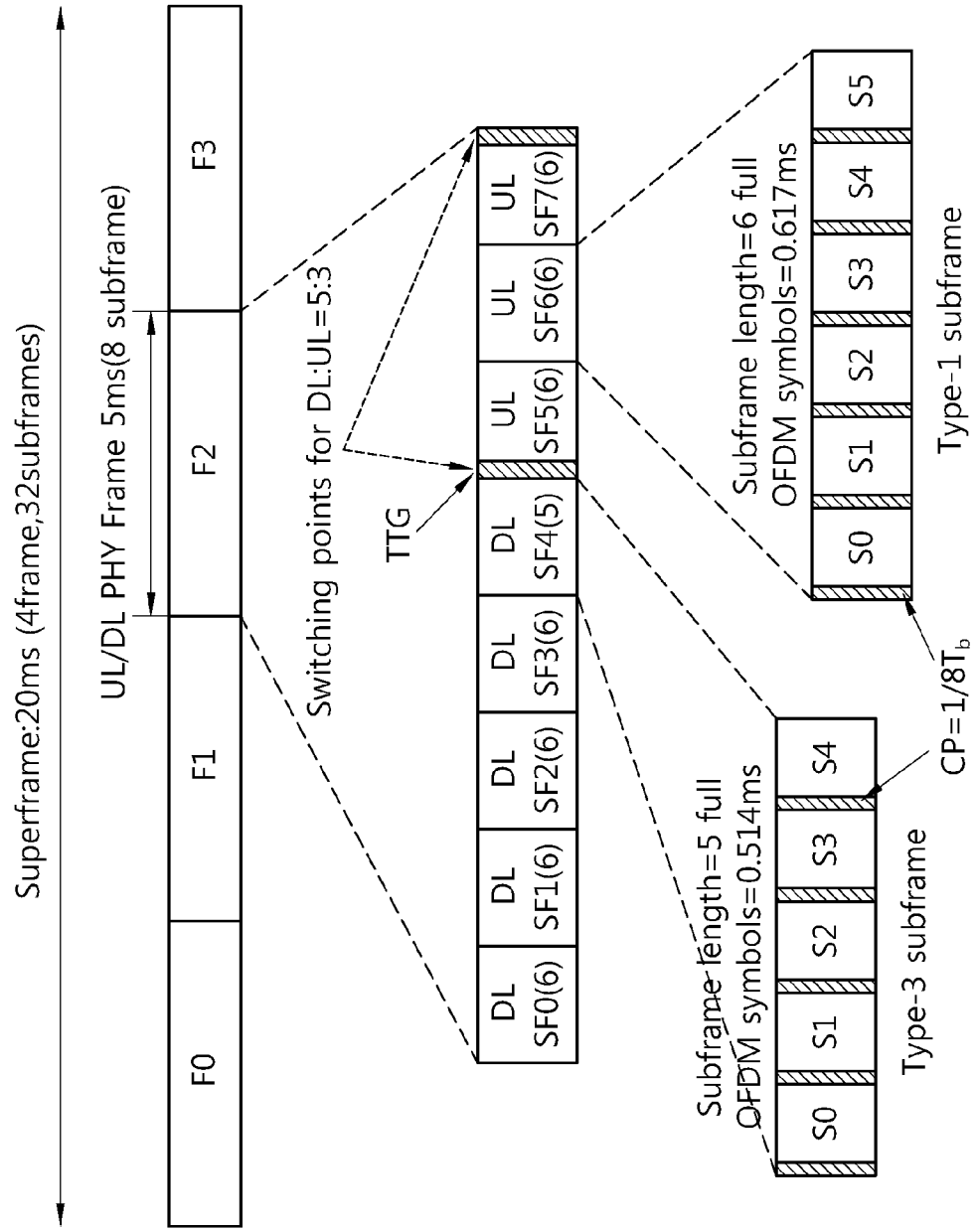

FIG. 3 shows another example of a frame structure. The frame structure of FIG. 3 is a time division duplex (TDD) frame structure, when G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and a ratio of a downlink (DL) subframe to an uplink (UL) subframe is 5:3. The last DL subframe SF4 includes 5 OFDMA symbols, and the remaining subframes include 6 OFDMA symbols. The TDD frame structure of FIG. 3 can be used when a bandwidth is 5 MHz, 10 MHz, or 20 MHz.

Figure 4:
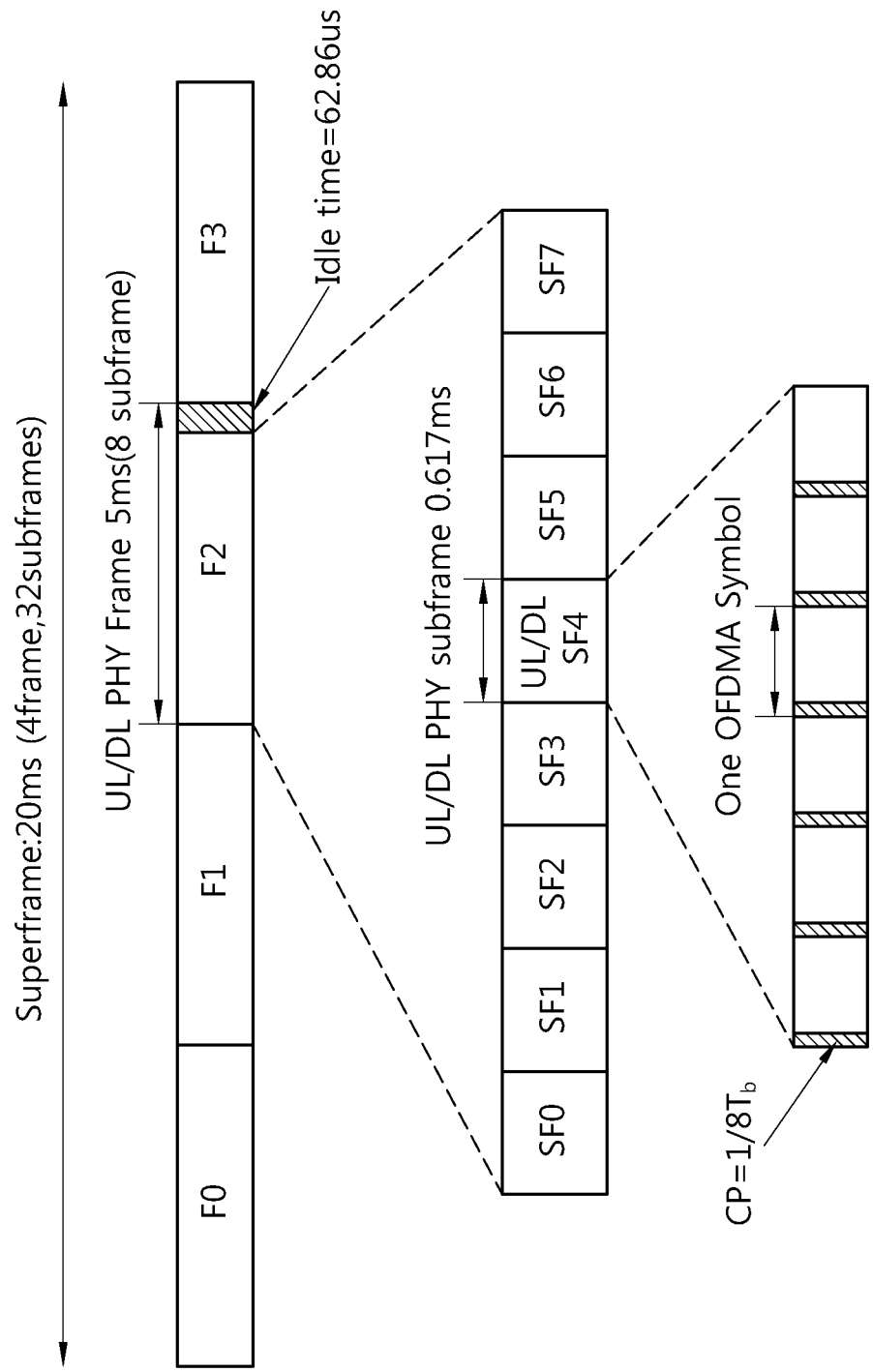

FIG. 4 shows another example of a frame structure. The frame structure of FIG. 4 is a frequency division duplex (FDD) frame structure, when G=1/8. A superframe having a length of 20 ms consists of 4 frames F0, F1, F2, and F3 each having a length of 5 ms. One frame consists of 8 subframes SF0, SF1, SF2, SF3, SF4, SF5, SF6, and SF7, and all subframes include a DL region and a UL region. DL transmission and UL transmission are identified in a frequency region. The FDD frame structure of FIG. 4 can be used when a bandwidth is 5 MHz, 10 MHz, or 20 MHz.

Figure 5:
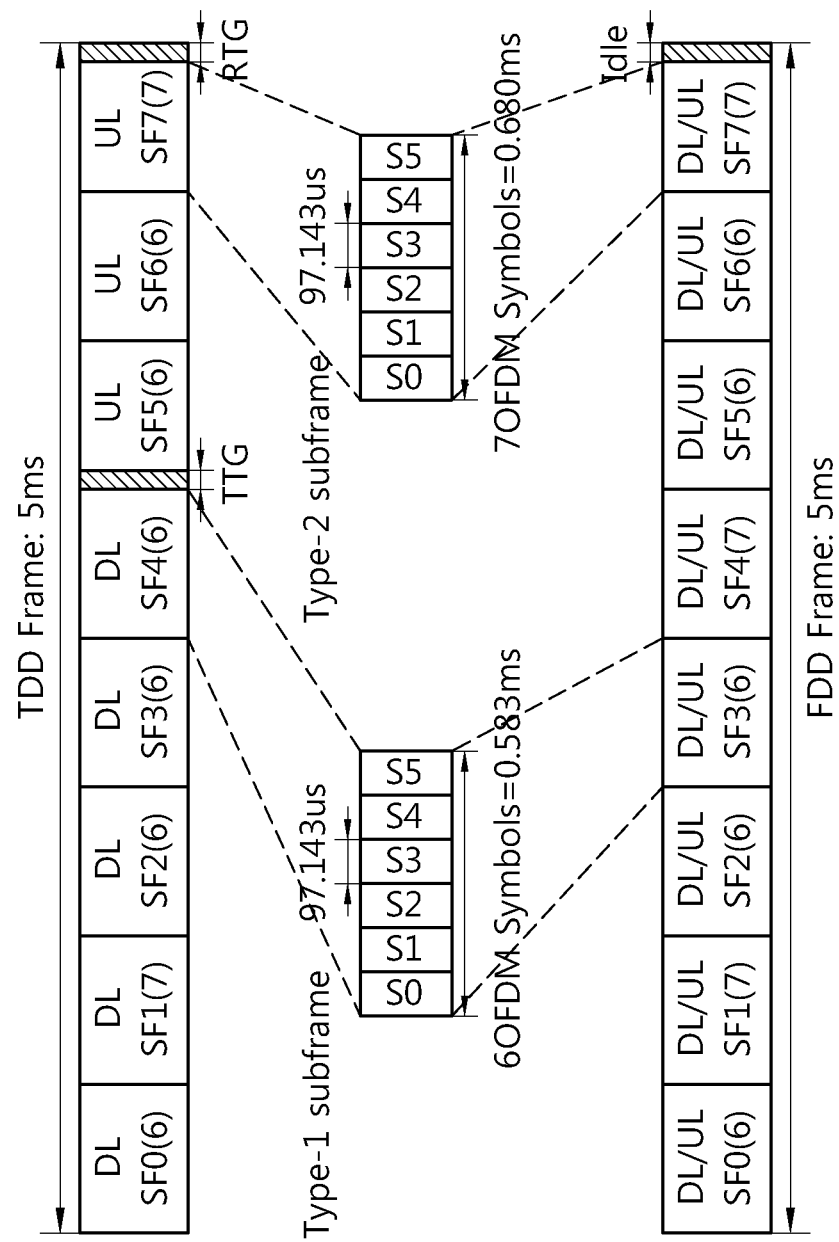

FIG. 5 shows another example of a frame structure. The frame structure of FIG. 5 can apply both to TDD and FDD systems, when G=1/8. There are 8 subframes SF0, SF1, SF2, SF3, SF4, SF5, SF6, and SF7, and a ratio of a DL subframe to a UL subframe is 5:3. The TDD frame structure of FIG. 5 can apply to a case where a bandwidth is 5 MHz, 10 MHz, or 20 MHz. Each subframe may include 6 or 7 OFDMA symbols.

Figure 6:
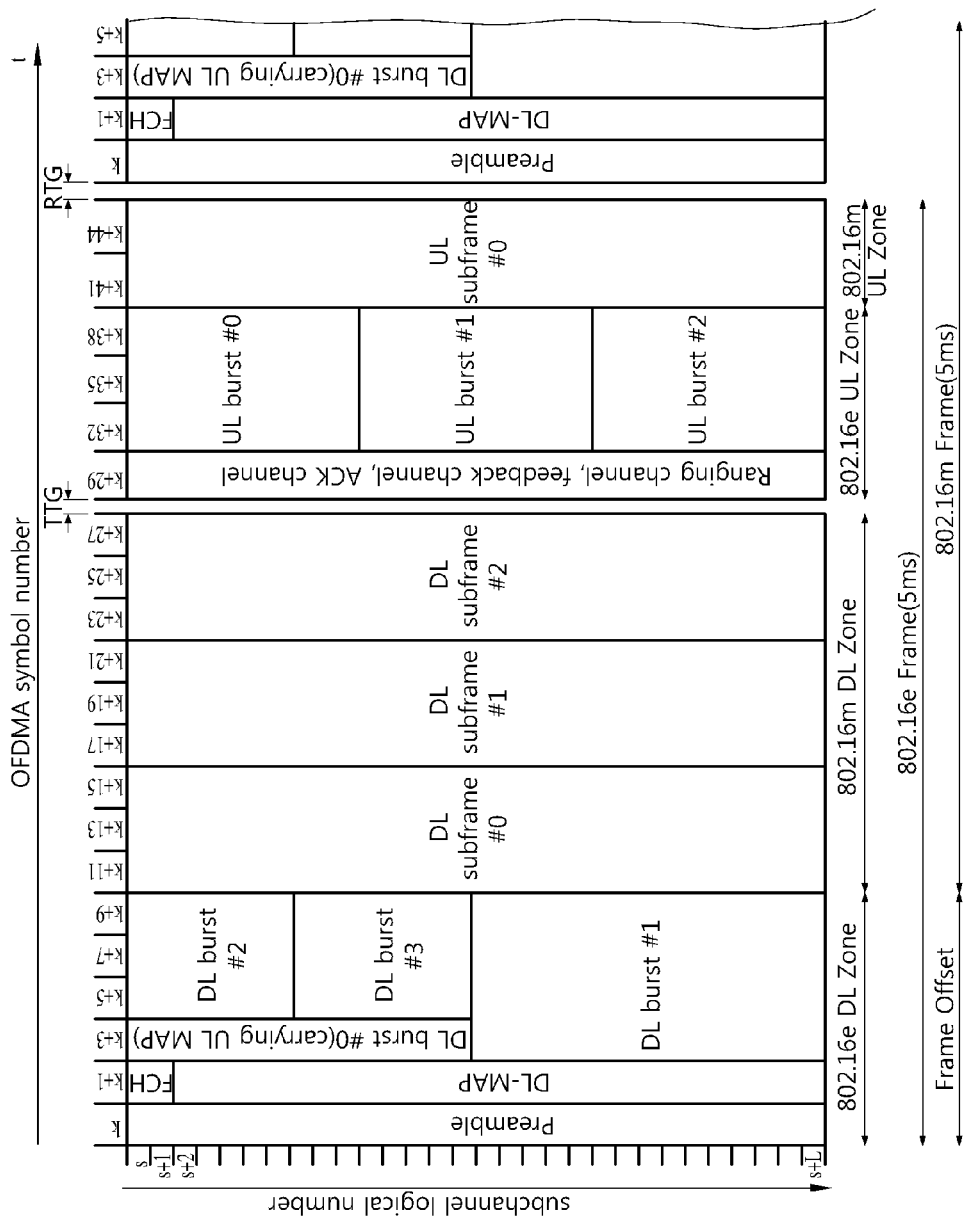

FIG. 6 shows another example of a frame structure. The frame structure of FIG. 6 is a TDD frame structure in the legacy support mode in which not only an MS supporting an IEEE 802.16m system, but also an MS supporting an IEEE 802.16e system is supported.

Referring to FIG. 6, the frame includes a DL subframe and an UL subframe. The DL subframe is anterior to the UL subframe in term of the time. The DL subframe is started in order of a preamble, a frame control header (FCH), a DL-MAP, an UL-MAP, and a burst region. The UL subframe includes an uplink control channel such as a feedback channel or a ranging channel, a burst region, and so on. A guard time for distinguishing the DL subframe and the UL subframe from each other is inserted into the middle part (between the DL subframe and the UL subframe) and the last part (subsequent to the UL subframe) of the frame. A transmit/receive transition gap (TTG) is a gap between a DL burst and a subsequent UL burst. A receive/transmit transition gap (RTG) is a gap between an UL burst and a subsequent DL burst. A DL region and an UL region are divided into a region for a 16e MS and a region for a 16m AMS. In the DL region, the preamble, the FCH, DL-MAP, the UL-MAP, and the DL burst region are regions for the 16e MS, and the remaining DL regions are regions for the 16m AMS. In the UL region, the uplink control channel and the UL burst region are regions for the 16e MS, and the remaining UL regions are regions for the 16m AMS. In the UL region, the regions for the 16e MS and the regions for the 16m AMS can be multiplexed in various ways. In FIG. 6, the UL region is illustrated to be multiplexed according to the TDM scheme, but the present invention is not limited thereto. For example, the UL region can be multiplexed according to the FDM scheme.

The preamble is used for initial synchronization between a BS and an MS, cell search, frequency offset, and channel estimation. The FCH includes information about the length of a DL-MAP message and the coding scheme of a DL-MAP. The DL-MAP is a region in which the DL-MAP message is transmitted. The DL-MAP message is used to define access to a DL channel. This means that the DL-MAP message defines instruction information or control information or both about the DL channel. The DL-MAP message includes the configuration change count of a downlink channel descriptor (DCD) and a BS identifier (ID). The DCD describes a DL burst profile currently applied to a map. The DL burst profile refers to the characteristic of a DL physical channel, and the DCD is periodically transmitted by a BS through a DCD message. The UL-MAP is a region in which an UL-MAP message is transmitted. The UL-MAP message defines access to an UL channel. This means that the UL-MAP message defines instruction information or control information or both about the UL channel. The UL-MAP message includes the configuration change count of an uplink channel descriptor (UCD) and an UL allocation start time defined by the UL-MAP. The UCD describes an UL burst profile. The UL burst profile refers to the characteristic of an UL physical channel. The UCD is periodically transmitted by a BS through an UCD message. The DL burst is a region in which data are transmitted from a BS to an MS, and the UL burst is a region in which data are transmitted from an MS to a BS. The fast feedback region is included in the UL burst region of an OFDMA frame. The fast feedback region is used to transmit information requiring fast response to a BS. The fast feedback region can be used for CQI transmission. The position of the fast feedback region is determined by the UL-MAP. The position of the fast feedback region can be a fixed position or a variable position within the OFDMA frame.

Table 2 to Table 4 show a frame configuration depending on a bandwidth and a frame configuration index set indicating the frame configuration. A bandwidth, a cyclic prefix (CP) length, frame configuration information, etc., are indicated by a frame configuration index, and the frame configuration index can be transmitted by an S-SFH SP1.

In a frame configuration supporting an IEEE 802.16e system (WirelessMAN-OFDMA) of Table 2 to Table 4, X:Y(Z) of DL Mix denotes a ratio of an 802.16e DL subframe and an 802.16m DL subframe. That is, X:Y is defined as 802.16e DL subframe: 802.16m DL subframe. Z in parentheses denotes a frame offset. Likewise, X:Y of UL Mix denotes a ratio of an 802.16e UL subframe to an 802.16m DL subframe in a UL time division multiplexing (TDM) mode or a ratio of an 802.16e UL sub-channel to an 802.16m UL sub-channel in a UL frequency division multiplexing (FDM) mode. Meanwhile, in Table 2, a bandwidth of 5 MHz and 20 MHz does not support the 802.16e system.

Table 2 shows a frame configuration and an index set indicating the frame configuration when a bandwidth is 5/10/20 MHz.

TABLE 2

| No | BW | CP | Frame configuration index | Duplex | D:U | DL Mix | WirelessMAN-OFDMA Support UL MUX | UL Mix | #0 | #1 | #2 | #3 | AAI subframe Type #4 | #5 | #6 | #7 | TTG/RTG (us) |
|---|---|---|---|---|---|---|---|---|---|---|---|---|---|---|---|---|---|
| 1 | 5/10/20 | 1/16 | 0 | TDD | 6:2 | N/A | N/A | N/A | DL type1 | DL type2 | DL type1 | DL type1 | DL type1 | DL type1 | UL type1 | UL type2 | 82.853/60 |
| 2 | 5/10/20 | 1/16 | 1 | TDD | 5:3 | N/A | N/A | N/A | DL type1 | DL type2 | DL type1 | DL type1 | DL type1 | UL type1 | UL type1 | UL type2 | 82.853/60 |
| 3 | 5/10/20 | 1/16 | 2 | TDD | 4:4 | N/A | N/A | N/A | DL type1 | DL type2 | DL type1 | DL type1 | UL type1 | UL type1 | UL type1 | UL type2 | 82.853/60 |
| 4 | 5/10/20 | 1/16 | 3 | TDD | 3:5 | N/A | N/A | N/A | DL type1 | DL type2 | DL type1 | UL type1 | UL type1 | UL type1 | UL type1 | UL type2 | 82.853/60 |
| 5 | 5/10/20 | 1/16 | 4 | FDD | N/A | N/A | N/A | N/A | D/U type1 | D/U type2 | D/U type | D/U type1 | D/U type2 | D/U type1 | D/U type1 | D/U type2 | N/A |
| 6 | 5/10/20 | 1/8 | 0 | TDD | 6:2 | N/A | N/A | N/A | DL type1 | DL type1 | DL type1 | DL type1 | DL type3 | DL type1 | UL type1 | UL type1 | 105.714/60 |
| 7 | 5/10/20 | 1/8 | 1 | TDD | 5:3 | N/A | N/A | N/A | DL type1 | DL type1 | DL type1 | DL type1 | DL type3 | UL type1 | UL type1 | UL type1 | 105.714/60 |
| 8 | 5/10/20 | 1/8 | 2 | TDD | 4:4 | N/A | N/A | N/A | DL type1 | DL type1 | DL type1 | DL type3 | UL type1 | UL type1 | UL type1 | UL type1 | 105.714/60 |
| 9 | 5/10/20 | 1/8 | 3 | TDD | 3:5 | N/A | N/A | N/A | DL type1 | DL type1 | DL type3 | UL type1 | UL type1 | UL type1 | UL type1 | UL type1 | 105.714/60 |
| 10 | 5/10/20 | 1/8 | 4 | FDD | N/A | N/A | N/A | N/A | D/U type1 | D/U type1 | D/U type | D/U type1 | D/U type1 | D/U type1 | D/U type1 | D/U type1 | N/A |
| 11 | 5/10/20 | 1/8 | 5 | TDD | 5:3 | 3:2(5) | FDM | 21:14 | DL type1 | DL type1 | UL type1 | UL type1 | UL type1 | Not used | Not used | Not used | 105.714/60 |
| 12 | 5/10/20 | 1/8 | 6 | TDD | 5:3 | 3:2(3) | TDM | 2:1 | DL type1 | DL type1 | Not used | Not used | UL type1 | Not used | Not used | Not used | 105.714/60 |
| 13 | 5/10/20 | 1/8 | 7 | TDD | 5:3 | 2:3(2) | FDM | 14:21 | DL type1 | DL type1 | DL type1 | UL type1 | UL type1 | UL type1 | Not used | Not used | 105.714/60 |
| 14 | 5/10/20 | 1/8 | 8 | TDD | 5:3 | 2:3(2) | TDM | 1:2 | DL type1 | DL type1 | DL type1 | Not used | UL type1 | UL type1 | Not used | Not used | 105.714/60 |
| 15 | 5/10/20 | 1/8 | 9 | TDD | 5:3 | 1:4(1) | FDM | 8:27 | DL type1 | DL type1 | DL type1 | DL type1 | UL type1 | UL type1 | UL type1 | Not used | 105.714/60 |
| 16 | 5/10/20 | 1/8 | 10 | TDD | 5:3 | 1:4(1) | TDM | 1:2 | DL type1 | DL type1 | DL type1 | DL type1 | Not used | UL type1 | UL type1 | Not used | 105.714/60 |
| 17 | 5/10/20 | 1/8 | 11 | TDD | 6:2 | N/A | N/A | N/A | DL type1 | DL type1 | DL type1 | DL type1 | DL type3 | DL type3 | UL type1 | UL type1 | 208.571/60 |
| 18 | 5/10/20 | 1/8 | 12 | TDD | 5:3 | N/A | N/A | N/A | DL type1 | DL type1 | DL type1 | DL type3 | DL type3 | UL type1 | UL type1 | UL type1 | 208.571/60 |
| 19 | 5/10/20 | 1/8 | 13 | TDD | 5:3 | N/A | N/A | N/A | DL type1 | DL type1 | DL type3 | DL type3 | DL type3 | UL type1 | UL type1 | UL type1 | 311.428/60 |
| 20 | 5/10/20 | 1/4 | 0 | TDD | 5:2 | N/A | N/A | N/A | DL type1 | DL type1 | DL type1 | DL type1 | DL type1 | UL type1 | UL type1 | | 139.988/60 |
| 21 | 5/10/20 | 1/4 | 1 | TDD | 4:3 | N/A | N/A | N/A | DL type1 | DL type1 | DL type1 | DL type1 | UL type1 | UL type1 | UL type1 | | 139.988/60 |
| 22 | 5/10/20 | 1/4 | 2 | TDD | 3:4 | N/A | N/A | N/A | DL type1 | DL type1 | DL type1 | UL type1 | UL type1 | UL type1 | UL type1 | | 139.988/60 |
| 23 | 5/10/20 | 1/4 | 3 | FDD | N/A | N/A | N/A | N/A | D/U type1 | D/U type1 | D/U type | D/U type2 | D/U type1 | D/U type1 | D/U type1 | | N/A |

Table 3 shows a frame configuration and an index set indicating the frame configuration when a bandwidth is 8.75 MHz.

Table 4 shows a frame configuration and an index set indicating the frame configuration when a bandwidth is 7 MHz.

TABLE 3

| No | BW | CP | Frame configuration index | Duplex | D:U | WirelessMAN-OFDMA Support DL Mix | UL MUX | UL Mix | AAI subframe Type #0 | #1 | #2 | #3 | #4 | #5 | #6 | #7 | TTG/RTG (us) |
|---|---|---|---|---|---|---|---|---|---|---|---|---|---|---|---|---|---|
| 1 | 8.75 | 1/16 | 0 | TDD | 5:2 | N/A | N/A | N/A | DL type1 | DL type2 | DL type1 | DL type1 | DL type1 | UL type1 | UL type2 | | 138.4/74.4 |
| 2 | 8.75 | 1/16 | 1 | TDD | 4:3 | N/A | N/A | N/A | DL type1 | DL type2 | DL type1 | DL type1 | UL type1 | UL type1 | UL type2 | | 138.4/74.4 |
| 3 | 8.75 | 1/16 | 2 | TDD | 3:4 | N/A | N/A | N/A | DL type1 | DL type2 | DL type1 | UL type1 | UL type1 | UL type1 | UL type2 | | 138.4/74.4 |
| 4 | 8.75 | 1/16 | 3 | FDD | N/A | N/A | N/A | N/A | D/U type1 | D/U type2 | D/U type1 | D/U type2 | D/U type1 | D/U type1 | D/U type2 | | N/A |
| 5 | 8.75 | 1/8 | 0 | TDD | 5:2 | N/A | N/A | N/A | DL type1 | DL type1 | DL type1 | DL type1 | DL type1 | UL type1 | UL type1 | | 87.2/74.4 |
| 6 | 8.75 | 1/8 | 1 | TDD | 4:3 | N/A | N/A | N/A | DL type1 | DL type1 | DL type1 | DL type1 | UL type1 | UL type1 | UL type1 | | 87.2/74.4 |
| 7 | 8.75 | 1/8 | 2 | TDD | 3:4 | N/A | N/A | N/A | DL type1 | DL type1 | DL type1 | UL type1 | UL type1 | UL type1 | UL type1 | | 87.2/74.4 |
| 8 | 8.75 | 1/8 | 3 | FDD | N/A | N/A | N/A | N/A | D/U type1 | D/U type1 | D/U type1 | D/U type2 | D/U type1 | D/U type1 | D/U type1 | | N/A |
| 9 | 8.75 | 1/8 | 4 | TDD | 5:2 | 3:2(3) | FDM | 21:14 | DL type1 | DL type1 | UL type1 | UL type4 | Not used | Not used | Not used | | 87.2/74.4 |
| 10 | 8.75 | 1/8 | 5 | TDD | 5:2 | 3:2(3) | TDM | 1:1 | DL type1 | DL type1 | Not used | UL type1 | Not used | Not used | Not used | | 87.2/74.4 |
| 11 | 8.75 | 1/8 | 6 | TDD | 5:2 | 2:3(2) | FDM | 14:21 | DL type1 | DL type1 | DL type1 | UL type1 | UL type4 | Not used | Not used | | 87.2/74.4 |
| 12 | 8.75 | 1/8 | 7 | TDD | 5:2 | 2:3(2) | TDM | 1:1 | DL type1 | DL type1 | DL type1 | Not used | UL type1 | Not used | Not used | | 87.2/74.4 |
| 13 | 8.75 | 1/8 | 8 | TDD | 5:2 | 1:4(1) | FDM | 8:27 | DL type1 | DL type1 | DL type1 | DL type1 | UL type4 | Not used | Not used | | 87.2/74.4 |
| 14 | 8.75 | 1/8 | 9 | TDD | 5:2 | 1:4(1) | TDM | 1:1 | DL type1 | DL type1 | DL type1 | DL type1 | Not Used | UL type1 | Not used | | 87.2/74.4 |
| 15 | 8.75 | 1/4 | 0 | TDD | 4:2 | N/A | N/A | N/A | DL type1 | DL type2 | DL type1 | DL type1 | UL type1 | UL type2 | | | TBD |
| 16 | 8.75 | 1/4 | 1 | TDD | 3:3 | N/A | N/A | N/A | DL type1 | DL type2 | DL type1 | DL type1 | UL type1 | UL type2 | | | TBD |
| 17 | 8.75 | 1/4 | 2 | TDD | 2:4 | N/A | N/A | N/A | DL type1 | DL type2 | UL type1 | UL type1 | UL type1 | UL type2 | | | TBD |
| 18 | 8.75 | 1/4 | 3 | FDD | N/A | N/A | N/A | N/A | D/U type1 | D/U type2 | D/U type1 | D/U type2 | D/U type1 | D/U type2 | | | N/A |

TABLE 4

| No | BW | CP | Frame configuration Duplex | Frame configuration index | D:U | WirelessMAN-OFDMA Support DL Mix | WirelessMAN-OFDMA Support UL MUX | WirelessMAN-OFDMA Support UL Mix | AAI subframe Type #0 | #1 | #2 | #3 | #4 | #5 | #6 | #7 | TTG/RTG (us) |
|---|---|---|---|---|---|---|---|---|---|---|---|---|---|---|---|---|---|
| 1 | 7 | 1/16 | TDD | 0 | 4:2 | N/A | N/A | N/A | DL type1 | DL type1 | DL type1 | DL type3 | UL type1 | UL type1 | | | 180/60 |
| 2 | 7 | 1/16 | TDD | 1 | 3:3 | N/A | N/A | N/A | DL type1 | DL type1 | DL type1 | UL type1 | UL type1 | UL type1 | | | 180/60 |
| 3 | 7 | 1/16 | TDD | 2 | 2:4 | N/A | N/A | N/A | DL type1 | DL type3 | UL type3 | UL type1 | UL type1 | UL type1 | | | 180/60 |
| 4 | 7 | 1/16 | FDD | 3 | N/A | N/A | N/A | N/A | type1 D/U | type3 D/U | type1 D/U | type1 D/U | type1 D/U | type1 D/U | | | N/A |
| 5 | 7 | 1/8 | TDD | 0 | 3:2 | N/A | N/A | N/A | DL type1 | DL type1 | DL type1 | UL type1 | UL type1 | type1 | | | 188/60 |
| 6 | 7 | 1/8 | TDD | 1 | 2:3 | N/A | N/A | N/A | DL type1 | DL type2 | UL type2 | UL type1 | UL type2 | | | | 188/60 |
| 7 | 7 | 1/8 | FDD | 2 | N/A | N/A | N/A | N/A | type1 D/U | type2 D/U | type2 D/U | type2 D/U | type2 D/U | | | | 188/60 |
| 8 | 7 | 1/8 | TDD | 3 | 3:2 | 1:2(1) | FDM | 12:23 | DL type1 | DL type2 | UL type1 | UL type1 | Not used | | | | 188/60 |
| 9 | 7 | 1/8 | TDD | 4 | 3:2 | 1:2(1) | TDM | 1:1 | DL type1 | DL type1 | Not used | UL type1 | Not used | | | | 188/60 |
| 10 | 7 | 1/4 | TDD | 0 | 3:2 | N/A | N/A | N/A | DL type1 | DL type1 | DL type1 | UL type1 | UL type1 | | | | 140/60 |
| 11 | 7 | 1/4 | TDD | 1 | 3:3 | N/A | N/A | N/A | DL type1 | DL type1 | DL type1 | UL type1 | UL type1 | type1 D/U | | | 140/60 |
| 12 | 7 | 1/4 | FDD | 2 | N/A | N/A | N/A | N/A | type1 D/U | type1 D/U | type2 D/U | type1 D/U | type1 D/U | | | | N/A |

A subframe includes a plurality of physical resource units (PRUs) in the frequency domain. The PRU is a basic physical unit for resource allocation, and consists of a plurality of consecutive OFDMA symbols in the time domain and a plurality of consecutive subcarriers in the frequency domain. The number of OFDMA symbols included in the PRU may be equal to the number of OFDMA symbols included in one subframe. Therefore, the number of OFDMA symbols in the PRU can be determined according to a subframe type. For example, when one subframe consists of 6 OFDMA symbols, the PRU may be defined with 18 subcarriers and 6 OFDMA symbols.

A logical resource unit (LRU) is a basic logical unit for distributed resource allocation and contiguous resource allocation. The LRU is defined with a plurality of OFDMA symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a distributed subcarrier group in one frequency partition. The DRU has the same size as the PRU. A tile is a basic unit of constituting the DLRU, and a size of an uplink tile is 6 subcarriers*Nsym OFDMA symbols. Nsym may be changed according to a subframe type.

A contiguous logical resource unit (CLRU) may be used to obtain a frequency selective scheduling gain. The CLRU includes a localized subcarrier group. The CLRU has the same size as the PRU.

Meanwhile, a fractional frequency reuse (FFR) scheme can be used in a cellular system having multiple cells. The FFR scheme splits a full frequency band into a plurality of frequency partitions (FPs), and allocates a part of the FP to each cell. According to the FFR scheme, different FPs can be allocated between neighbor cells, and the same FP can be allocated between cells separated far from one another. Therefore, inter-cell interference (ICI) can be reduced, and performance of a UE located in a cell edge can be increased.

Figure 7:
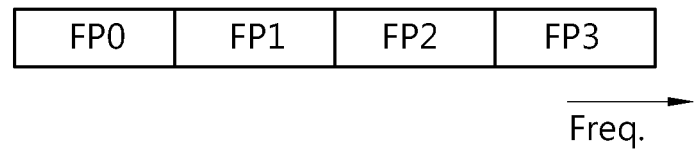
FIG. 7 shows an example of a method of splitting a full frequency band into a plurality of frequency partitions.

FIG. 7 shows an example of a method of splitting a full frequency band into a plurality of FPs.

Referring to FIG. 7, the full frequency band is split into frequency partition #0, frequency partition #1, frequency partition #2, and frequency partition #3. Each FP can be physically or logically split from the full frequency band.

Figure 8:
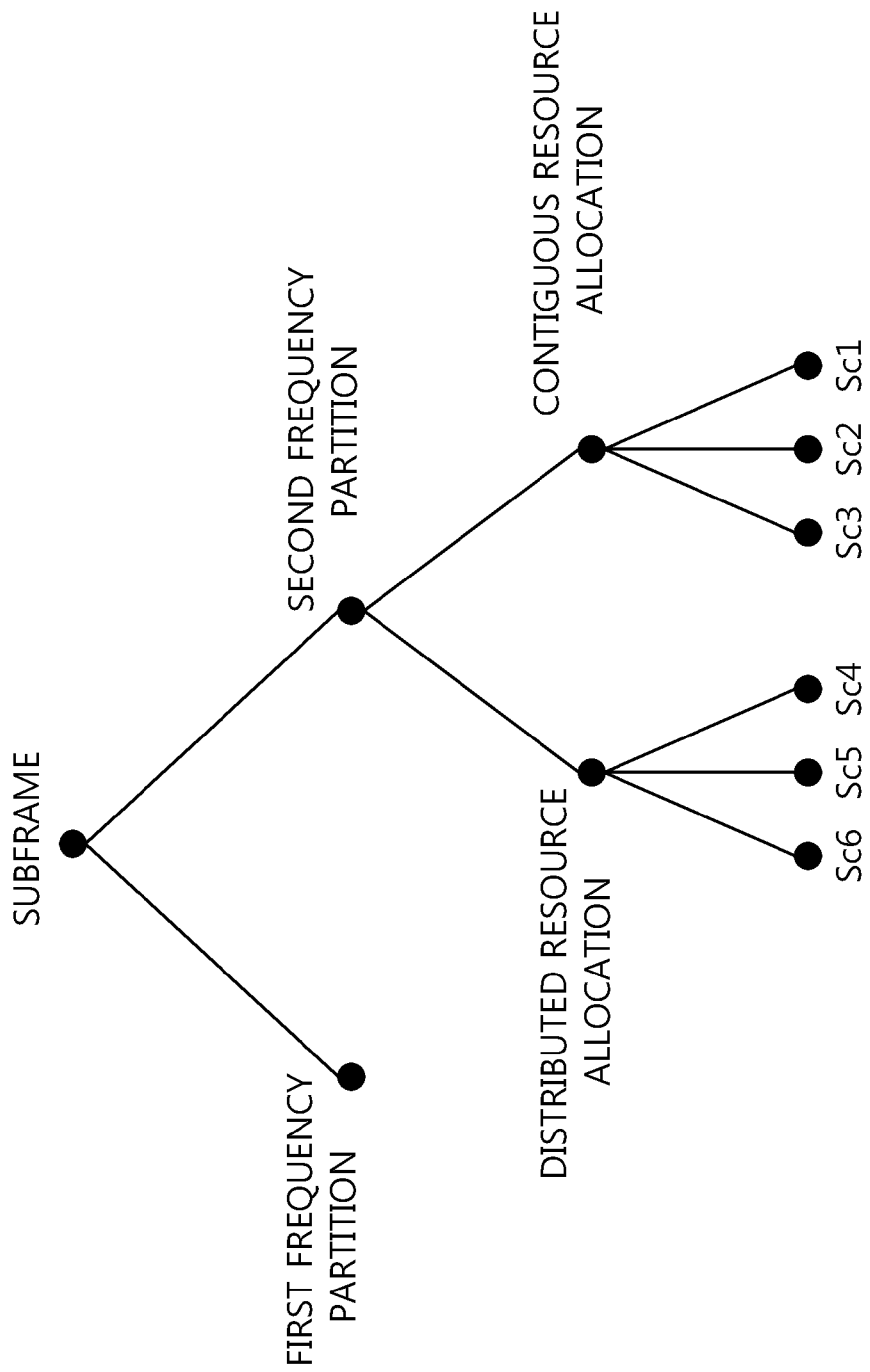
FIG. 8 shows an example of a cellular system using a fractional frequency reuse (FFR) scheme.

FIG. 8 shows an example of a cellular system using an FFR scheme.

Referring to FIG. 8, each cell is divided into an inner cell and a cell edge. Further, each cell is divided into three sectors. A full frequency band is split into four FPs (i.e., frequency partition #0, frequency partition #1, frequency partition #2, and frequency partition #3).

The frequency partition #0 is allocated in an inner cell. Any one of the frequency partition #1 to the frequency partition #3 is allocated in each sector of a cell edge. In this case, different FPs are allocated between neighbor cells. Hereinafter, an allocated FP is referred to as an active FP, and an unallocated FP is referred to as an inactive FP. For example, when the frequency partition #1 is allocated, the frequency partition #1 is an active FP, and the frequency partition #2 and the frequency partition #3 are inactive FPs.

A frequency reuse factor (FRF) can be defined according to the number of cells (or sectors) into which the full frequency band can be split. In this case, the FRF may be 1 in an inner cell, and may be 3 in each sector of a cell edge.

Figure 9:
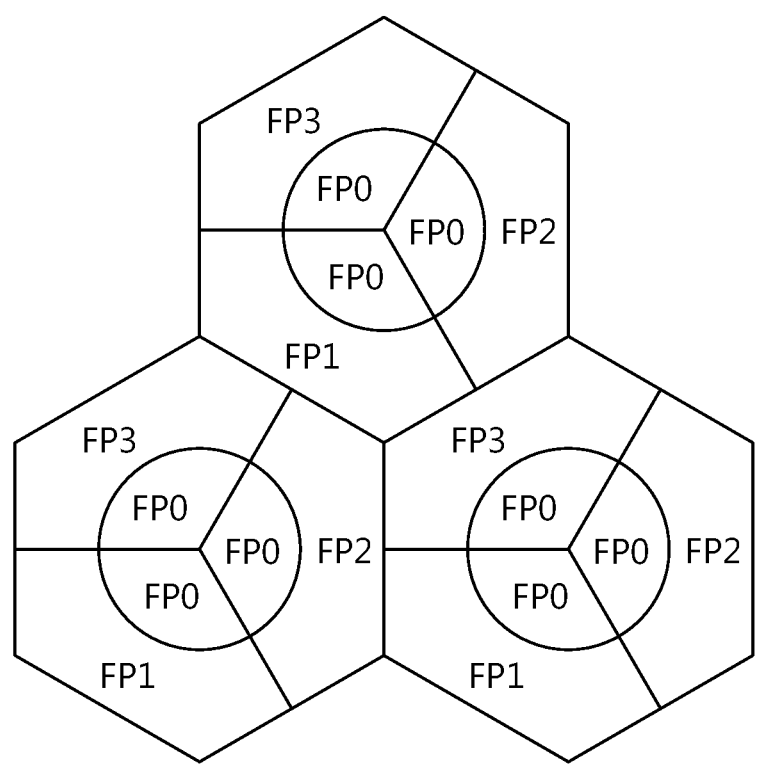
FIG. 9 shows an example of an uplink resource structure.

FIG. 9 shows an example of an uplink resource structure.

Referring to FIG. 9, an uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR. Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

When a plurality of cells exist, an uplink resource may be mapped by performing various processes such as subband partitioning, miniband permutation, frequency partitioning, etc.

Figure 10:
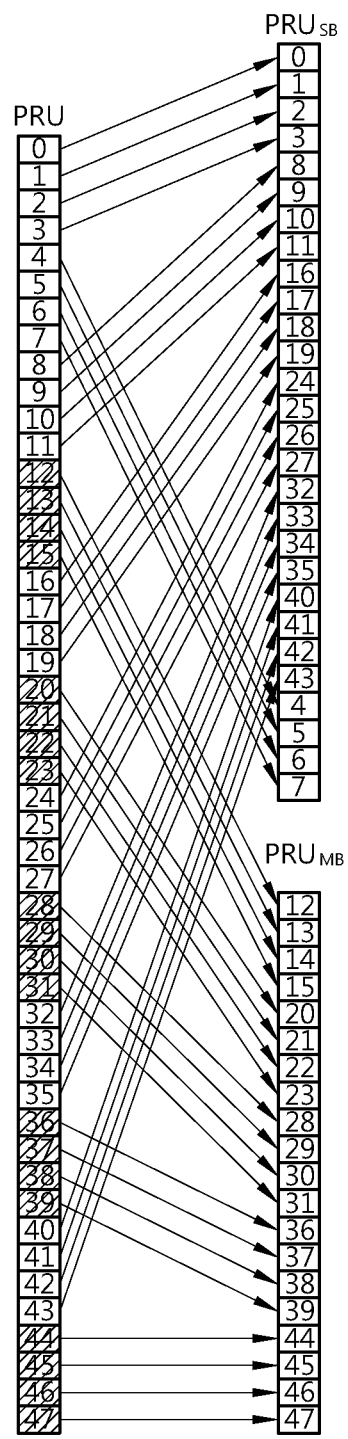
FIG. 10 shows an example of a subband partitioning process.

FIG. 10 shows an example of a subband partitioning process. A bandwidth of 10 MHz is used in the subband partitioning process of FIG. 10.

A plurality of PRUs is divided into a subband (SB) and a miniband (MB). The plurality of PRUs is allocated to the SB in FIG. 7($a$), and is allocated to the MB in FIG. 7($b$). The SB includes N1 contiguous PRUs, and the MB includes N2 contiguous PRUs. In this case, N1 may be 4 and N2 may be 1. The SB is suitable for frequency selective resource allocation since it provides contiguous allocation of PRUs in a frequency domain. The MB is suitable for frequency diverse resource allocation and may be permutated in the frequency domain.

The number of SBs can be denoted by $K_{SB}$. The number of PRUs allocated to the SBs can be denoted by $L_{SB}$, where $L_{SB}=N1*K_{SB}$. The $K_{SB}$ may vary depending on a bandwidth. The $K_{SB}$ may be determined by an uplink subband allocation count (USAC). A length of the USAC may be 3 bits or 5 bits, and may be broadcast by using an SFH or the like. PRUs remaining after being allocated to the SBs are allocated to MBs. The number of MBs can be denoted by $K_{MB}$. The number of PRUs allocated to the MBs can be denoted by $L_{MB}$, where $L_{MB}=N2*K_{MB}$. The maximum number of SBs that can be formed in a resource region is $N_{sub}=\lfloor N_{PRU}/N1 \rfloor$. The total number of PRUs is $N_{PRU}=L_{SB}+L_{MB}$.

Table 5 shows an example of a relation between the USAC and the $K_{SB}$ when using a bandwidth of 20 MHz. When the bandwidth is 20 MHz, an FFT size may be 2048.

TABLE 5

| USAC | $K_{SB}$ |
| --- | --- |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | reserved |
| 23 | reserved |
| 24 | reserved |
| 25 | reserved |
| 26 | reserved |

TABLE 5-continued

| USAC | $K_{SB}$ |
|---|---|
| 27 | reserved |
| 28 | reserved |
| 29 | reserved |
| 30 | reserved |
| 31 | reserved |

Table 6 shows an example of a relation between the USAC and the $K_{SB}$ when using a bandwidth of 10 MHz. When the bandwidth is 10 MHz, the FFT size may be 1024.

TABLE 6

| USAC | $K_{SB}$ |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | reserved |
| 12 | reserved |
| 13 | reserved |
| 14 | reserved |
| 15 | reserved |

Table 7 shows an example of a relation between the USAC and the $K_{SB}$ when using a bandwidth of 5 MHz. When the bandwidth is 5 MHz, the FFT size may be 512.

TABLE 7

| USAC | $K_{SB}$ |
|---|---|
| 0 | 0 |
| 1 | 1 |
| 2 | 2 |
| 3 | 3 |
| 4 | 4 |
| 5 | reserved |
| 6 | reserved |
| 7 | reserved |

A plurality of PRUs is divided into a subband (SB) and a miniband (MB), and is reordered in an SB PRU ($PRU_{SB}$) and an MB PRU ($PRU_{MB}$). PRUs in the $PRU_{SB}$ are respectively indexed from 0 to ($L_{SB}$−1). PRUs in the $PRU_{MB}$ are respectively indexed from 0 to ($L_{MB}$−1).

In the miniband permutation process, a $PRU_{MB}$ is mapped to a permutation PRU ($PPRU_{MB}$). In the frequency partitioning process, PRUs of a $PRU_{MB}$ and a $PPRU_{MB}$ are allocated to at least one frequency partition.

Hereinafter, a ranging channel will be described.

A ranging channel for a non-synchronized MS can be used for ranging on a target base station (BS) during initial network entry and handover of the MS. The ranging channel for the non-synchronized MS may include a ranging preamble (RP) having a length of $T_{RP}$ and a ranging cyclic prefix (RCP) having a length of $T_{RCP}$ in a time region $T_{RP}$ may vary depending on a ranging subcarrier spacing $\Delta f_{RP}$. The ranging channel can be allocated to one subband including 4 consecutive CLRUs.

Table 8 shows an example of a ranging channel format and parameters.

TABLE 8

| Format | $T_{RCP}$ | $T_{RP}$ | $\Delta f_{RP}$ |
|---|---|---|---|
| 0 | K1*Tg + K2*Tb | 2*Tb | $\Delta f/2$ |
| 1 | 3.5*Tg + 7*Tb | 8*Tb | $\Delta f/8$ |

Tb, Tg, and $\Delta f$ can be respectively defined as an useful symbol time, a CP length, and a subcarrier spacing according to Table 1. $T_{RCP}$ of a ranging channel format 0 may vary depending on an OFDMA parameter of Table 1 and a subframe type. In this case, k1=($N_{sym}$+1)/2, k2=($N_{sym}$−4)/2. $N_{sym}$ denotes the number of OFDMA symbols included in one subframe.

Figure 11:
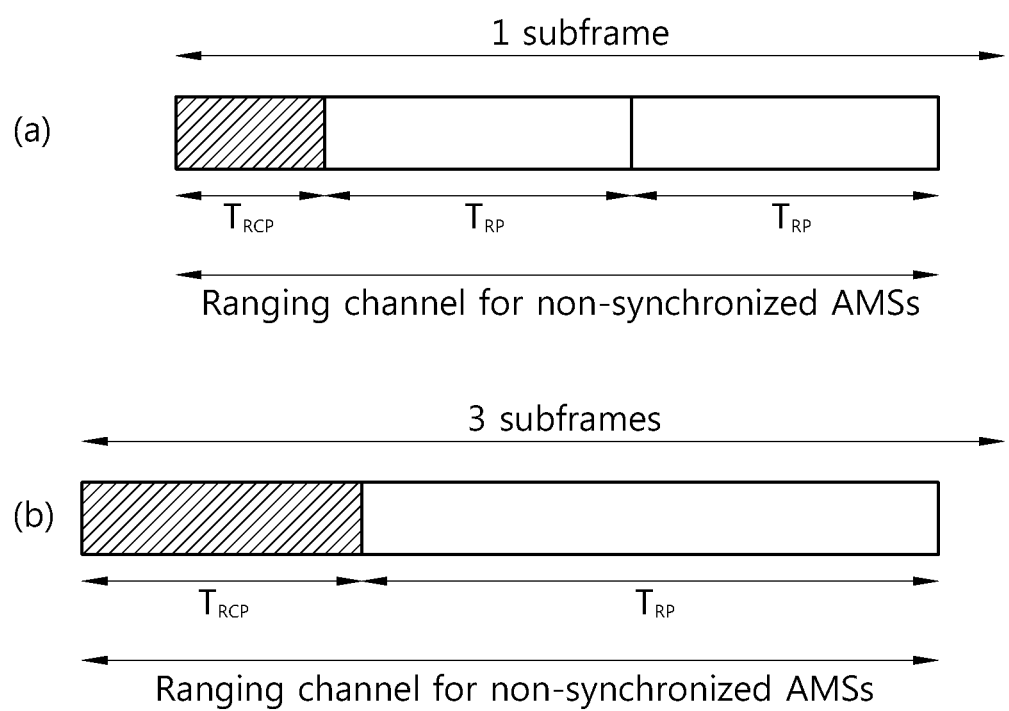
FIG. 11 shows an example of a ranging channel structure for a non-synchronized MS.

FIG. 11 shows an example of a ranging channel structure for a non-synchronized MS. The ranging channel for the non-synchronized MS can be allocated in one or three subframes according to the ranging channel format of Table 8. For example, the ranging channel for the non-synchronized MS can be allocated in one subframe when the ranging channel format is 0, and the ranging channel for the non-synchronized MS can be allocated in three subframes when the ranging channel format is 1. An RCP is a copy of a rear part of an RP, and phase discontinuity between the RCP and the RP dose not occur. A start point at which transmission of the ranging channel starts is aligned to a start point of a UL subframe corresponding to a DL synchronization obtained by a DL preamble in the MS. A time remaining after the ranging channel is transmitted in a subframe may be reserved to avoid interference between consecutive subframes. In a subframe in which the ranging channel for the non-synchronized MS is to be transmitted, the MS may not transmit any UL burst or UL control channel.

The ranging code transmits a ranging preamble code. The ranging preamble code transmitted on the ranging channel for the non-synchronized MS can be divided into an initial access ranging preamble code and a handover ranging preamble code according to usage. In each ranging code opportunity, the MS randomly selects one ranging preamble code from a set of selectable ranging preamble codes. However, in case of handover ranging, if a dedicated ranging code is allocated, the MS has to use the allocated dedicated ranging code.

A Zadoff-Chu (ZC) sequence on which a cyclic shift is performed can be used as the ranging preamble code of the ranging channel for the non-synchronized MS. Equation 1 shows an example of an equation for generating the ranging preamble code.

$$x_p(k) = \exp\left(-j \cdot \pi \frac{r_p \cdot k(k+1) + 2 \cdot k \cdot s_p \cdot N_{CS}}{N_{RP}}\right), \quad \text{[Equation 1]}$$

$$k = 0, 1, \ldots, N_{RP} - 1$$

p denotes an index of a ranging preamble code which is determined by performing a cyclic shift for $s_p$ times by $N_{CS}$ in a ZC sequence with a root index $r_p$. $r_p$ and $s_p$ can be defined by Equation 2.

$$r_p = \mod((1 - 2 \cdot \mod(\lfloor p/M \rfloor, 2)) \cdot \quad \text{[Equation 2]}$$
$$(\lfloor p/M/2 \rfloor + r_0) + N_{RP}, N_{RP}),$$
$$s_p = \mod(p, M)$$
$$p = 0, 1, \ldots, N_{TOTAL} - 1$$

A $p^{th}$ ranging preamble code is determined by using an $s_p^{th}$ cyclic shift and a root index $r_p$ determined from a start root index $r_0$. $N_{TOTAL}$ denotes a total number of ranging preamble codes of an initial access ranging channel and a handover ranging channel for each sector. Although it is assumed that $N_{TOTAL}$ includes only a contention-based preamble code allocated by an MS for convenience of explanation, a dedicated preamble code allocated by a BS may also be included. If $N_{TOTAL}$ also includes a dedicated preamble code, $N_{TOTAL}$ can be denoted by a sum of $N_{cont}$, which is the number of contention-based preamble codes, and $N_{dedi}$ which is the number of dedicated preamble codes. $N_{cont}$ can be denoted by a sum of $N_{IN}$, which is the number of ranging preamble codes of the initial access ranging channel, and $N_{HO}$ which is the number of ranging preamble codes of the handover ranging channel. $N_{dedi}$ may be less than or equal to 32.

$N_{CS}$ is a cyclic shift unit based on a cell size in a time region, and can be defined as $N_{CS}=\lfloor N_{RP}/M \rfloor$. Herein, M denotes the number of codes which are cyclic shifted for each root index of a ZC sequence, and can be determined by Table 9.

TABLE 9

| Index | 0 | 1 | 2 | 3 |
|---|---|---|---|---|
| M | 1 | 2 | 4 | 8 |

$N_{RP}$ denotes a length of the ranging preamble code, and may have a value of 139 when the ranging channel format determined by Table 8 is 0 and may have a value of 557 when the ranging channel format is 1. The values $r_0$ and M and ranging preamble code partition information may be broadcast through an SFH. In this case, a start root index $r_0$ of a ZC sequence can be expressed by $r_0=4k+1$ or $r_0=16k+1$ according to the ranging channel format. k may be broadcast through the S-SFH. k may be any one of integers ranged from 0 to 15. The ranging preamble code partition information denotes the number of ranging preamble codes of each ranging channel, and can be determined by Table 10.

TABLE 10

| Partition Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Number of initial ranging preamble codes. | 8 | 8 | 8 | 8 | 16 | 16 | 16 | 16 | 24 | 24 | 24 | 24 | 32 | 32 | 32 | 32 |
| Number of handover ranging preamble codes. | 8 | 16 | 24 | 32 | 8 | 16 | 24 | 32 | 8 | 16 | 24 | 32 | 8 | 16 | 24 | 32 |

The ranging channel for the non-synchronized MS can be allocated according to ranging channel time resource information indicating a time region allocated to the ranging channel and ranging channel frequency resource information indicating a frequency region allocated to the ranging channel. The ranging channel time resource information can indicate a subframe offset $O_{SF}$ of ranging channel allocation in the time region. The ranging channel time resource information can be broadcast by using the S-SFH. Table 11 shows an example of a time resource to which the ranging channel is allocated according to the ranging channel time resource information.

TABLE 11

| Configurations | The subframe allocating Ranging channel |
|---|---|
| 0 | $O_{SF}^{th}$ UL subframe in every frame |
| 1 | $O_{SF}^{th}$ UL subframes in the first frame in every superframe |

TABLE 11-continued

| Configurations | The subframe allocating Ranging channel |
|---|---|
| 2 | $O_{SF}^{th}$ UL subframe in the first frame in every even numbered superframe, i.e., mod(superframe number, 2) = 0 |
| 3 | $O_{SF}^{th}$ UL subframe of the first frame in every $4^{th}$ superframes, i.e., mod(superframe number, 4) = 0 |

Referring to Table 11, the ranging channel can be allocated in an $O_{SF}^{th}$ UL subframe in every frame. According to configuration of the ranging channel for the non-synchronized MS, the ranging channel for the non-synchronized MS can be allocated in the $O_{SF}^{th}$ UL subframe in every frame or can be allocated in a $O_{SF}^{th}$ UL subframe of a first frame in every superframe. Alternatively, by further lengthening a period to be allocated, the ranging channel for the non-synchronized MS can be allocated in an $O_{SF}^{th}$ UL subframe of a first frame of a superframe of which a superframe index is a multiple of 2 or 4. When the ranging channel format is 1, the ranging channel for the non-synchronized MS is allocated in three consecutive subframes from a subframe determined in Table 11.

The ranging channel frequency resource information can be determined by a cell identifier (ID) and $K_{SB}$ which is defined as the number of allocated subbands. A frequency resource to which the ranging channel is allocated can be determined in advance without having to be transmitted to the MS. The frequency resource to which the ranging channel is allocated can be determined by Equation 3.

$$I_{SB}=\text{mod}(IDCell, Y_{SB}) \quad \text{[Equation 3]}$$

In Equation 3, $I_{SB}$ denotes a subband index ($I_{SB}=0, \ldots, Y_{SB}-1$), IDCell denote a cell ID, and $Y_{SB}$ denotes the number of allocated subbands. mod(a,b) denotes a remainder obtained by dividing a by b. According to Equation 3, a different subband is allocated to the ranging channel for each BS.

Equation 4 shows a ranging signal transmitted through an antenna in a function of time.

$$s(t) = \text{Re}\left\{ e^{j2\pi f_C t} \sum_{k=-(N_{RP}-1)/2}^{(N_{RP}-1)/2} x_p(k + (N_{RP}-1)/2) \cdot e^{j2\pi(k+K_{offset})\Delta f_{RP}(t-T_{RCP})} \right\} \quad \text{[Equation 4]}$$

In Equation 4, t denotes a time elapsed from the start of the ranging channel. $N_{RP}$ denotes a length of a ranging preamble code in a frequency region. $x_p(n)$ denotes a $p^{th}$ ranging preamble code having a length of $N_{RP}$. $K_{offset}$ is a parameter related to a frequency position, and can be defined as $$K_{offset}=\{(N_{used}-1)/2-P_{SC}\cdot(k_0-2)+\lfloor 2\cdot k_0/N_{PRU} \rfloor\}\cdot\Delta f/\Delta f_{RP}.$$

$N_{PRU}$ denotes a total number of PRUs, and $k_0$ denotes a smallest PRU index among PRUs allocated to the ranging channel. Psc denotes the number of consecutive subcarriers in one PRU of the frequency region. $\Delta f_{RP}$ denotes a ranging subcarrier spacing.

A ranging channel for a synchronized MS may be used for periodic ranging. An MS which has already been synchronized with a target BS may transmit a ranging signal for the synchronized MS. The ranging channel for the synchronized MS may occupy 72 subcarriers and 6 OFDMA symbols starting from a first OFDMA symbol of one subframe. The ranging channel for the synchronized MS may occupy 72 subcarriers and 3 OFDMA symbols, and may consist of a basic unit generated from a ranging preamble code and a repeated unit which is one time repetition of the basic unit.

Figure 12:
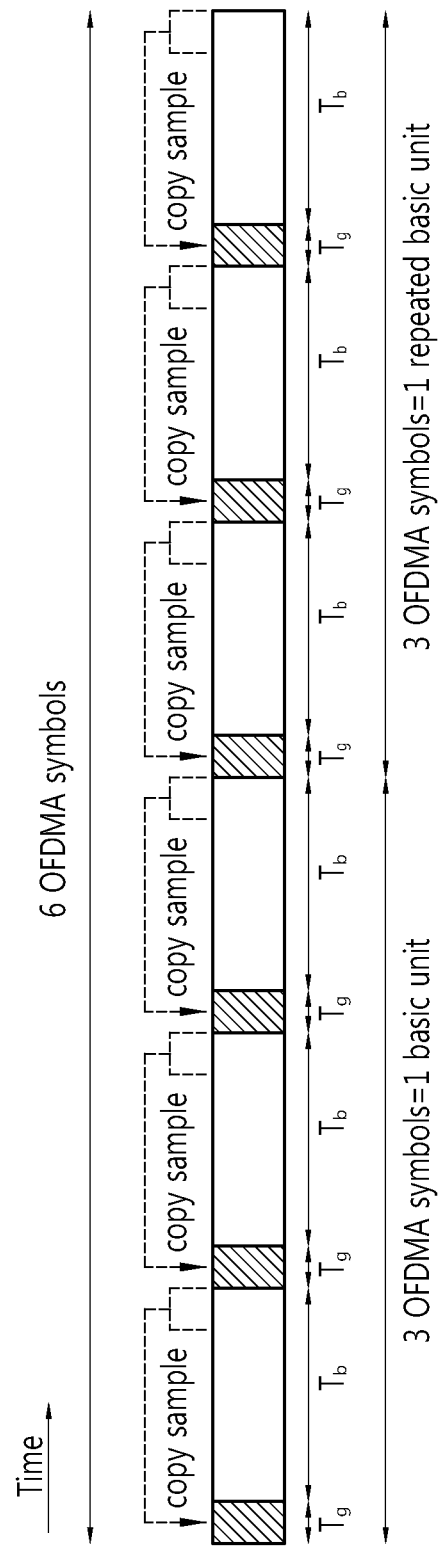
FIG. 12 shows an exemplary structure of a ranging channel for a synchronized MS.

FIG. 12 shows an exemplary structure of a ranging channel for a synchronized MS. Tb denotes a useful symbol time of Table 1. Tg denotes a CP time. First three OFDMA symbols are allocated to a basic unit, and next three OFDMA symbols are allocated to a repeated unit.

A padded ZC sequence on which a cyclic shift is performed can be used as a ranging preamble code of the ranging channel for the synchronized MS. Equation 5 is an example of the ranging preamble code used in the ranging channel for the synchronized MS.

$$x_p(n,k) = \exp\left(-j\cdot\pi\frac{r_p\cdot(k+s_p\cdot m)(k+s_p\cdot m+1)}{N_{RP}-1}\right)\cdot c_q(n), \quad \text{[Equation 5]}$$

$$k = 0, 1, \ldots, N_{RP}-1$$

p denotes an index of a ranging preamble code in an $n^{th}$ OFDMA symbol which is determined by performing a cyclic shift for $s_{p'}$ times by m from a ZC sequence with a root index $r_{p'}$. $p'$, $r_{p'}$, $s_{p'}$ can be defined by Equation 6.

$$p' = \mathrm{mod}[p,(N_{TOTAL}/3)]$$

$$r_{p'} = \mathrm{mod}((1-2\cdot\mathrm{mod}(\lfloor p'/M\rfloor,2))\cdot(\lfloor p'/M/2\rfloor+r_{s0})+N_{RP}, N_{RP}), p'=0,1,\ldots,N_{TOTAL}/6-1$$

$$s_{p'} = \mathrm{mod}(p',M), p'=0,1,\ldots,N_{TOTAL}/6-1 \quad \text{[Equation 6]}$$

A start root index $r_{s0}$ can be broadcast, and can be determined by $M=\lfloor N_{RP}/N_{CS}\rfloor$. m denotes a cyclic shift unit, and $N_{RP}$ denotes a length of the ranging preamble code. $N_{TOTAL}$ denotes a total number of periodic ranging preamble codes of the ranging channel for the synchronized MS for each sector, and can be determined by Table 12.

TABLE 12

| index | 0 | 1 | 2 | 3 |
|---|---|---|---|---|
| Number of periodic ranging preamble codes, $N_{PE}$ | 8 | 16 | 24 | 32 |

$C_q(n)$ denotes a DFT code or a Walsh code used as a ranging preamble covering code, and can be determined by Table 13.

TABLE 13

| | | OFDMA symbol index within a basic unit, n |  |
|---|---|---|---|
| $C_q(n)$ | | 0 | 1 |
| Covering code index, q | 0 | 1 | 1 |
| | 1 | 1 | −1 |

In contention-based code opportunity, the MS randomly selects one of two time-domain covering codes.

Equation 7 is another example of the ranging preamble code used in the ranging channel for the synchronized MS.

$$x_p(n,k) = \exp\left(-j\cdot\pi\left(\frac{r_p(71\cdot n+k)\binom{71\cdot n+k+1}{k+1}}{211}+\frac{2\cdot k\cdot s_p\cdot N_{TCS}}{N_{FFT}}\right)\right), \quad \text{[Equation 7]}$$

$$k = 0, 1, \ldots, N_{RP}-1; n = 0, 1, 2$$

p denotes an index of a ranging preamble code which constitutes a basic unit of a ranging channel and is determined by performing a cyclic shift from a ZC sequence with a root index $r_p$. $r_p$ and $s_p$ can be defined by Equation 8.

$$r_p = \mathrm{mod}\left(\begin{array}{c}(1-2\cdot\mathrm{mod}(\lfloor p/M\rfloor,2))\cdot\\(\lfloor p/M/2\rfloor+r_0)+211,211\end{array}\right), \quad \text{[Equation 8]}$$

$$s_p = \mathrm{mod}(p,\Gamma)$$

$$p = 0, 1, \ldots, N_{TOTAL}-1$$

A $p^{th}$ ranging preamble code is determined by using a root index $r_p$ determined from a start root index $r_0$. M denotes the number of codes which are cyclic shifted for each root index of a ZC sequence, and can be defined as M=1/G. $N_{TOTAL}$ denotes a total number of periodic ranging preamble codes of the ranging channel for the synchronized MS for each sector, and can be determined by Table 12.

$N_{TCS}$ is a cyclic shift unit in a time region for each OFDMA based on a CP length, and can be defined as $N_{TCS}=G*N_{FFT}$. G and $N_{FFT}$ can be defined by Table 1. $N_{RP}$ denotes a length of a ranging preamble code, and can be defined to $N_{RP}=71$ in the present embodiment. The start root index $r_o$ and ranging preamble code information may be broadcast by the BS. The ranging preamble code information can be defined by Table 12. A start root index $r_0$ of a ZC sequence can be expressed by $r_0=6k+1$ or $r_0=16k+1$ according to a ranging channel format. k may be a cell-specific value.

Similarly to the ranging channel for the non-synchronized MS, the ranging channel for the synchronized MS can also be allocated according to ranging channel time resource information indicating a time region allocated to the ranging channel and ranging channel frequency resource information indicating a frequency region allocated to the ranging channel. In this case, the ranging channel for the synchronized MS needs to be allocated by avoiding overlapping with the ranging channel for the non-synchronized MS. Accordingly, the frequency region or the time region in which the ranging channel for the synchronized MS is allocated needs to be configured differently from the frequency region or the time region in which the ranging channel for the non-synchronized MS is allocated.

Hereinafter, a method of allocating a ranging channel for a synchronized MS will be described according to an embodiment of the present invention.

Figure 13:
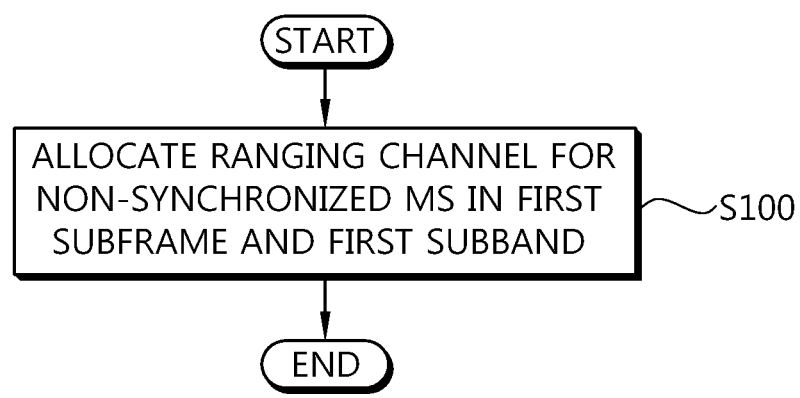
FIG. 13 shows a method of allocating a ranging channel for a synchronized MS according to an embodiment of the present invention.

FIG. 13 shows a method of allocating a ranging channel for a synchronized MS according to an embodiment of the present invention.

In step S100, a BS allocates the ranging channel for the synchronized MS in a first subframe and a first subband. An index of the first subframe and an index of the first subband are respectively determined based on an index of a second subframe and an index of a second subband in which a ranging channel for a non-synchronized MS is allocated.

First, a frequency region in which the ranging channel for the synchronized MS is allocated can be determined to be equal to a frequency region in which the ranging channel for the non-synchronized MS is allocated, and the channels can be allocated in different locations by providing an offset in a time region. In this case, information on the frequency region in which the ranging channel for the synchronized MS is allocated by fixing the offset and information on the ranging channel for the non-synchronized MS without additional signaling for the offset can be used without alteration.

For example, the frequency region in which the ranging channel for the synchronized MS is allocated may be configured to be equal to the frequency region in which the ranging channel for the non-synchronized MS is allocated, and the time region in which the ranging channel for the synchronized MS is allocated may be determined by providing an offset of 1 to a subframe index to which the ranging channel for the non-synchronized MS is allocated. That is, when the ranging channel for the non-synchronized channel is allocated in an $O_{SF}{}^{th}$ UL subframe, the ranging channel for the synchronized MS can be allocated in a $mod(O_{SF}+1, N_{UL})^{th}$ UL subframe. Table 14 is an example of configurations of a subframe in which the ranging channel for the synchronized MS is allocated.

TABLE 14

| Configurations | The subframe allocating Ranging channel |
|---|---|
| 0 | $mod(O_{SF}+1, N_{UL})^{th}$ UL subframe in every frame |
| 1 | $mod(O_{SF}+1, N_{UL})^{th}$ UL subframes in the first frame in every superframe |
| 2 | $mod(O_{SF}+1, N_{UL})^{th}$ UL subframe in the first frame in every even numbered superframe, i.e., mod(superframe number, 2) = 0 |
| 3 | $mod(O_{SF}+1, N_{UL})^{th}$ UL subframe of the first frame in every $4^{th}$ superframes, i.e., mod(superframe number, 4) = 0 |

Referring to Table 14, the ranging channel for the synchronized MS can be allocated in a $mod(O_{SF}+1, N_{UL})^{th}$ UL subframe in every frame. The ranging channel for the synchronized MS can be allocated in a $mod(O_{SF}+1, N_{UL})^{th}$ UL subframe in every frame, or can be allocated in a $mod(O_{SF}+1, N_{UL})^{th}$ UL subframe in every superframe. Alternatively, by further lengthening a period to be allocated, the ranging channel for the synchronized MS can be allocated in a $mod(O_{SF}+1, N_{UL})^{th}$ UL subframe of a first frame of a superframe of which a superframe index is a multiple of 2 or 4. A location of a frequency region in which the ranging channel for the synchronized MS is allocated may be equal to a location of a frequency region in which the ranging channel for the non-synchronized MS is allocated as shown in Equation 3.

Even if the ranging channel for the synchronized MS is allocated as shown in Table 14, if the number of allocated subbands is $Y_{SB}=1$ and the number of UL subframes in a frame is $N_{UL}=1$, the ranging channel for the non-synchronized MS and the ranging channel for the synchronized MS are allocated in an overlapping manner. In addition, even if a period of the ranging channel is longer than one frame, the ranging channel for the non-synchronized MS and the ranging channel for the synchronized MS can use the same resource.

Therefore, when the period of the ranging channel is longer than one frame, the ranging channel for the non-synchronized MS and the ranging channel for the synchronized MS can be allocated to different frames so as to prevent the two channels from overlapping. That is, the ranging channel for the non-synchronized MS and the ranging channel for the synchronized MS can have a frame offset. Table 15 shows an example of a subframe configuration for allocating the ranging channel for the synchronized MS.

TABLE 15

| Configurations | The subframe allocating Ranging channel |
|---|---|
| 0 | $mod(O_{SF}+1, N_{UL})^{th}$ UL subframe in every frame |
| 1 | $mod(O_{SF}+1, N_{UL})^{th}$ UL subframes in the second frame in every superframe |
| 2 | $mod(O_{SF}+1, N_{UL})^{th}$ UL subframe in the second frame in every $4^{th}$ superframes, superframe, i.e., mod(superframe number, 4) = 0 |
| 3 | $mod(O_{SF}+1, N_{UL})^{th}$ UL subframe of the second frame in every $8^{th}$ superframes, i.e., mod(superframe number, 8) = 0 |

Referring to Table 15, in comparison with Table 14, when a period of the ranging channel is longer than one frame, the ranging channel for the synchronized MS is allocated in a $mod(O_{SF}+1, N_{UL})^{th}$ UL subframe of a second frame of a superframe. The second frame in which the ranging channel for the synchronized MS is allocated is for exemplary purposes only, and thus the ranging channel for the synchronized MS can be allocated in a frame to which the ranging channel for the non-synchronized MS is not allocated such as a third or fourth frame. In addition, if $Y_{SB}=1$ and $N_{UL}=1$, overlapping of the two channels is inevitable. Thus, if $Y_{SB}=1$ and $N_{UL}=1$, a configuration 0 cannot be used when the ranging channel for the synchronized MS is allocated.

Table 16 shows an example of a subframe configuration for allocating the ranging channel for the synchronized MS.

TABLE 16

| Configurations | The subframe allocating Ranging channel |
|---|---|
| 0 | $mod(O_{SF}, N_{UL})^{th}$ UL subframe in every frame |
| 1 | $mod(O_{SF}, N_{UL})^{th}$ UL subframes in the second frame in every superframe |
| 2 | $mod(O_{SF}, N_{UL})^{th}$ UL subframe in the second frame in every $4^{th}$ superframes, superframe, i.e., mod(superframe number, 4) = 0 |
| 3 | $mod(O_{SF}, N_{UL})^{th}$ UL subframe of the second frame in every $8^{th}$ superframes, i.e., mod(superframe number, 8) = 0 |

Referring to Table 16, in comparison with Table 15, a time region in which the ranging channel for the non-synchronized MS and a time region in which the ranging channel for the synchronized MS are allocated are identified only with a frame offset, without a subframe offset.

Alternatively, the time region in which the ranging channel for the synchronized MS is allocated may be determined to be equal to the time region in which the ranging channel for the non-synchronized MS is allocated, and the channels can be allocated in different locations by providing an offset in a frequency region. In this case, information on the frequency region in which the ranging channel for the synchronized MS is allocated by fixing the offset and information on the ranging channel for the non-synchronized MS without additional signaling for the offset can be used without alteration.

For example, the time region in which the ranging channel for the synchronized MS is allocated may be configured to be equal to the time region in which the ranging channel for the non-synchronized MS is allocated, and the frequency region in which the ranging channel for the synchronized MS is allocated may be determined by providing an offset of 1 to a subframe index to which the ranging channel for the non-synchronized MS is allocated. That is, an index of a subband in which the ranging channel for the synchronized MS is allocated can be determined by Equation 9.

$$I_{SB} = \mod(IDCell+1, Y_{SB}) \quad \text{[Equation 9]}$$

In Equation 9, $I_{SB}$ denotes a subband index ($I_{SB}=0, \ldots, Y_{SB}-1$), IDCell denote a cell ID, and $Y_{SB}$ denotes the number of allocated subbands. mod(a,b) denotes a remainder obtained by dividing a by b. According to Equation 9, an index of a subband in which the ranging channel for the synchronized MS is allocated has an offset of 1 with respect to an index of a subband in which the ranging channel for the non-synchronized MS is allocated.

Table 17 shows an example of a subframe configuration for allocating the ranging channel for the synchronized MS.

TABLE 17

| Configurations | The subframe allocating Ranging channel |
|---|---|
| 0 | $\mod(O_{s,SF}, N_{UL})^{th}$ UL subframe in every frame |
| 1 | $\mod(O_{s,SF}, N_{UL})^{th}$ UL subframes in the second frame in every superframe |
| 2 | $\mod(O_{s,SF}, N_{UL})^{th}$ UL subframe in the second frame in every even superframes, superframe, i.e., mod(superframe number, 2) = 0 |
| 3 | $\mod(O_{s,SF}, N_{UL})^{th}$ UL subframe of the second frame in every $4^{th}$ superframes, i.e., mod(superframe number, 4) = 0 |

In Table 17, $O_{s,SF}$ can be determined by Equation 10.

$$O_{s,SF} = \begin{cases} \mod(O_{SF}+1, N_{UL}), & \text{if } K_{SB}=1 \\ O_{SF}, & \text{otherwise} \end{cases} \quad \text{[Equation 10]}$$

When the number of subbands allocated by Equation 10 is 1, the ranging channel for the synchronized MS and the ranging channel for the non-synchronized MS can be allocated by having a subframe offset.

Alternatively, the time region and the frequency region in which the ranging channel for the synchronized MS is allocated can be allocated by providing an offset both to the time region and the frequency region in which the ranging channel for the non-synchronized MS is allocated. In this case, information on the frequency region in which the ranging channel for the synchronized MS is allocated by fixing an offset in the time region and an offset of the frequency region and information on the ranging channel for the non-synchronized MS without additional signaling for the offset can be used without alternation. A location of the frequency region of the ranging channel for the synchronized MS can be determined by Equation 9, and a location of the frequency region can be determined by Table 14.

Figure 14:
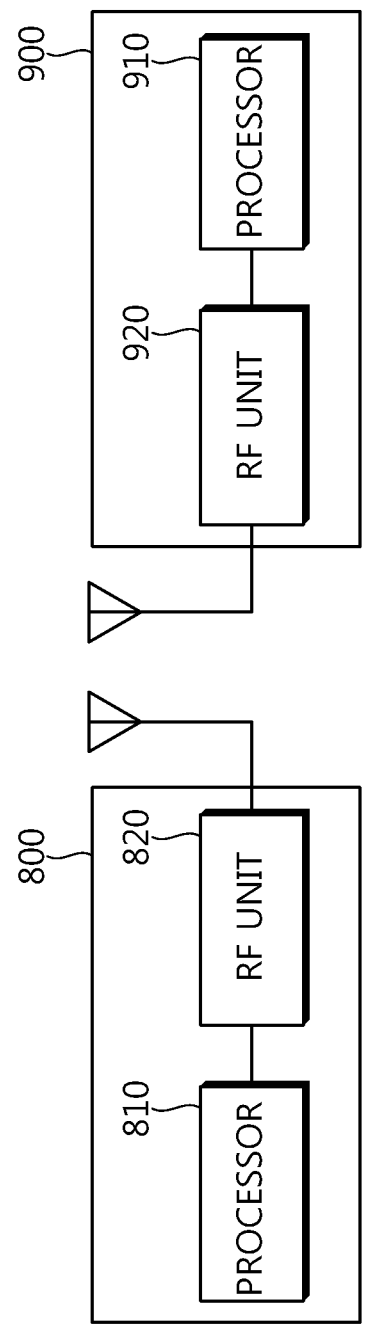
FIG. 14 is a block diagram illustrating a BS and an MS for implementing an embodiment of the present invention.

FIG. 14 is a block diagram illustrating a BS and an MS for implementing an embodiment of the present invention.

A BS 800 includes a processor 810 and a radio frequency (RF) unit 820. The processor 810 allocates a ranging channel for a synchronized MS in a first subframe and a first subband. An index of the first subframe and an index of the first subband are determined respectively based on an index of a second subband and a second subband in which a ranging channel of a non-synchronized MS is allocated. A location of a time region of the ranging channel for the synchronized MS can be determined by Table 14 to Table 17, and a location of a frequency region can be determined by Equation 9. The RF unit 820 is coupled to the processor 810, and transmits and/or receives a radio signal.

An MS 900 includes a processor 910 and an RF unit 920. The processor 910 processes a ranging signal to be transmitted to the BS. The RF unit 920 is coupled to the processor 910, and transmits the ranging signal through a ranging channel for a synchronized MS.

According to the present invention, uplink resources allocated to a ranging channel for a non-synchronized mobile station (MS) and a ranging channel for a synchronized MS can be prevented from overlapping.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of allocating a ranging channel for a synchronized mobile station in a wireless communication system, the method comprising:
   allocating, by a base station, the ranging channel for the synchronized mobile station in a first subframe and a first subband,
   wherein the first subframe is determined using a $\mod(O_{SF}+1, N_{UL})^{th}$ uplink subframe,
   wherein $O_{SF}$ denotes a subframe offset of a ranging channel for a non-synchronized mobile station, and
   wherein $N_{UL}$ denotes a number of uplink subframes per frame.

2. The method of claim 1,
   wherein the first subband is determined using $\mod(IDcell+1, Y_{SB})$,
   wherein IDcell denotes a cell identifier (ID), and
   wherein $Y_{SB}$ denotes a number of allocated subbands.

3. The method of claim 1, wherein the first subframe is allocated in a second frame in every superframe or in a superframe of which a superframe index is a multiple of 4 or 8.

4. The method of claim 1, wherein the ranging channel for the synchronized mobile station is a periodic ranging channel for periodic ranging.

5. The method of claim 1, wherein the ranging channel for the non-synchronized mobile station is a ranging channel for initial network entry and association or a handover ranging channel for ranging on a target base station during a handover.

6. The method of claim 1, wherein the first subband comprises 72 consecutive subcarriers.

7. An apparatus for allocating a ranging channel for a synchronized mobile station in a wireless communication system, the apparatus comprising:
 a radio frequency (RF) unit for transmitting or receiving a radio signal; and
 a processor coupled to the RF unit and configured to allocate the ranging channel for the synchronized mobile station in a first subframe and a first subband,
 wherein the first subframe is determined using a mod($O_{SF}$+1,$N_{UL}$)$^{th}$ uplink subframe,
 wherein $O_{SF}$ denotes a subframe offset of a ranging channel for a non-synchronized mobile station, and
 wherein $N_{UL}$ denotes a number of uplink subframes per frame.

8. The apparatus of claim 7,
 wherein the first subband is determined using mod(IDcell+1,$Y_{SB}$),
 wherein IDCell denotes a cell identifier (ID), and
 wherein $Y_{SB}$ denotes a number of allocated subbands.

9. The method of claim 1, further comprising transmitting synchronized ranging channel allocation information including the subframe offset $O_{SF}$ for ranging resource allocation in a time domain.

10. The method of claim 1, wherein synchronized ranging channel allocation information is broadcast through a secondary superframe header (S-SFH).

11. The method of claim 1, further comprising allocating, by the base station, the ranging channel for the non-synchronized mobile station based on a second subframe and a second subband.

12. The method of claim 11, wherein the second subframe is determined using a mod($O_{SF}$,$N_{UL}$)$^{th}$ uplink subframe.

13. The method of claim 11, wherein the second subband is determined using mod(IDcell,$Y_{SB}$).

14. The method of claim 1, wherein the first subframe is allocated in every frame.

15. A method of ranging for a synchronized mobile station in a wireless communication system, the method comprising:
 receiving, by the synchronized mobile station, ranging channel information from a base station; and
 ranging, by the synchronized mobile station, on the base station through a ranging channel for the synchronized mobile station in a first subframe and a first subband,
 wherein the first subframe is determined using a mod($O_{SF}$+1, $N_{UL}$)$^{th}$ uplink subframe,
 wherein $O_{SF}$ denotes a subframe offset of a ranging channel for a non-synchronized mobile station, and
 wherein $N_{UL}$ denotes a number of uplink subframes per frame.

16. The method of claim 15,
 wherein the first subband is determined using mod(IDcell+1,$Y_{SB}$),
 wherein IDCell denotes a cell identifier (ID), and
 wherein $Y_{SB}$ denotes a number of allocated subbands.

17. The method of claim 15, further comprising transmitting synchronized ranging channel allocation information including the subframe offset $O_{SF}$ for ranging resource allocation in a time domain.

18. The method of claim 15, wherein synchronized ranging channel allocation information is broadcast through a secondary superframe header (S-SFH).

* * * * *